(12) United States Patent
Zuta et al.

(10) Patent No.: US 7,573,467 B2
(45) Date of Patent: Aug. 11, 2009

(54) GRAPHIC INPUT DEVICE AND METHOD

(76) Inventors: Marc Zuta, P.O. Box 2162, Petah Tikva (IL) 49120; Idan Zuta, 19 Ben Yehuda St., P.O. Box 2162, Petah Tikva (IL) 49120

( * ) Notice: Subject to any disclaimer, the term of this patent is extended or adjusted under 35 U.S.C. 154(b) by 545 days.

(21) Appl. No.: 10/992,656

(22) Filed: Nov. 22, 2004

(65) Prior Publication Data

US 2005/0110775 A1 May 26, 2005

(30) Foreign Application Priority Data

Nov. 21, 2003 (GB) .................................. 0327098.0

(51) Int. Cl.
*G06F 3/037* (2006.01)
*G06F 3/041* (2006.01)
(52) U.S. Cl. .................. 345/179; 345/156; 345/173; 178/18.01; 178/18.04
(58) Field of Classification Search .............. 345/156, 345/173–184
See application file for complete search history.

(56) References Cited

U.S. PATENT DOCUMENTS

| 5,239,139 | A | * | 8/1993 | Zuta ........................ 178/19.02 |
| 6,184,873 | B1 | * | 2/2001 | Ward et al. ................... 345/179 |
| 6,335,723 | B1 | * | 1/2002 | Wood et al. .................. 345/173 |
| 6,633,280 | B1 | * | 10/2003 | Matsumoto et al. ......... 345/173 |
| 7,218,040 | B2 | * | 5/2007 | Toda ........................... 310/369 |
| 2005/0150697 | A1 | * | 7/2005 | Altman et al. ............ 178/19.02 |

FOREIGN PATENT DOCUMENTS

WO   PCT/IL2003/000309   10/2003

* cited by examiner

*Primary Examiner*—Duc Q Dinh

(57) ABSTRACT

A Graphic Input Device comprises a pen-shaped pointing device moving about a writing surface and using ultrasonic (US) waves propagating in the air to measure displacement. Can be used in either a 2D or 3D mode. Uses displacement measuring means for two directions in space, each parallel to the writing surface, and comprising means to establish an US waves path between an US transmitter and an US receiver; means to measure changes in the phase of the received signal, and for computing the displacement. Means for measuring displacement in a third dimension are optionally provided.

20 Claims, 28 Drawing Sheets

GRAPHIC INPUT DEVICE AND METHOD

The present invention claims priority from patent application No. GB 0327098.0 filed in Great Britain on 21 Nov. 2003 by the same inventors, with the same title.

TECHNICAL FIELD

The present invention relates generally to graphic input devices for computers. The invention relates in particular to a pen-shaped input device using ultrasonic waves.

BACKGROUND ART

The presently popular graphic input device—the computer mouse—has many disadvantages, however no other device could replace it, despite various attempts and many patents in this field.

A pen-shaped device is highly desirable, to allow natural handwriting or drawing. For pointing at icons on a computer's screen, a pen may allow a user to precisely point at the desired location. A pen is easier to use.

The prior art mechanical mouse has lower reliability and requires more effort on the user's part, than a noncontact, ultrasonic device.

Various attempts at using ultrasonic waves in input devices have been made. There are two basic approaches: devices using waves propagating in a solid (writing pad) and devices using waves propagating in the air.

The latter type is considered preferable, since no continuous contact with the writing pad is required. Two basic implementations of this type are known in the art:

a. A pen-shaped device wherein both the ultrasonic transmitter and the receiver are located in the pen. Waves reflected off the writing surface have a Doppler shift indicative of the pen's movement. See for example:

Zuta Marc, U.S. Pat. No. 5,239,139—Ultrasonic digitizer pen having integrated transmitter and receiver.

b. A pointing device containing an ultrasonic transmitter, with the corresponding receiver being at a fixed location. Alternately, the transmitter is fixed and the receiver is installed in the pen. See for example:

1. U.S. Pat. No. 4,862,152—Milner Sonic positioning device
2. U.S. Pat. No. 4,682,159—Davison Apparatus and method for controlling a cursor on a computer display
3. U.S. Pat. No. 4,578,674—Baker, et al. Method and apparatus for wireless cursor position control
4. U.S. Pat. No. 5,315,512—Roth Apparatus and method for generating image representations of a body utilizing an ultrasonic imaging subsystem and a three-dimensional digitizer subsystem
5. U.S. Pat. No. 5,637,839—Yamaguchi, et al. Ultrasonic coordinate input apparatus
6. U.S. Pat. No. 6,151,014—Zloter, et al. Systems and processing algorithms for ultrasound time-of-flight digitizer systems
7. U.S. Pat. No. 4,953,141—Novak, et al. Sonic distance-measuring device
8. U.S. Pat. No. 4,777,329—Mallicoat Graphic input system
9. U.S. Pat. No. 4,814,552—Stefik, et al. Ultrasound position input device
10. U.S. Pat. No. 5,866,856—Holtzman Marking device for electronic presentation board
11. U.S. Pat. No. 5,308,936—Biggs, et al. Ultrasonic pen-type data input device
12. U.S. Pat. No. 5,434,370—Wilson, et al. Marking system with pen-up/pen-down tracking
13. U.S. Pat. No. 5,009,277—Sindeband, et al. Method and apparatus for position determination
14. U.S. Pat. No. 6,067,080—Holtzman Retrofittable apparatus for converting a substantially planar surface into an electronic data capture
15. U.S. Pat. No. 6,292,177—Holtzman, et al. Marking device for electronic presentation board
16. U.S. Pat. No. 6,326,565—Holtzman, et al. Marking device for electronic presentation board
17. U.S. Pat. No. 6,300,580—Shenholz, et al. Presentation board digitizer systems
18. U.S. Pat. No. 6,265,676—Zloter, et al. Systems and processing algorithms for ultrasound time-of-flight digitizer
19. U.S. Pat. No. 4,825,116—Itoh, et al. Transmitter-receiver of ultrasonic distance measuring device
20. U.S. Pat. No. 4,991,148—Gilchrist, Acoustic digitizing system
21. U.S. Pat. No. 5,280,457—Figueroa et al., Position detecting system
22. U.S. Pat. No. 5,517,579—Baron, et al., Handwriting input apparatus for handwriting recognition using more than one sensing technique
23. U.S. Pat. No. 6,373,003—Holtzman, Marking device for electronic presentation board
24. U.S. Pat. No. 6,392,330—Zloter et al., Cylindrical ultrasound receivers and transceivers formed from piezoelectric film.
25. WO 01/69281 A1—Serafini, Serge, et at., PDP PERSONAL DIGITAL PEN
26. DE 003036947 A Postl Wolfgang, SIEMENS AG, Coordinate measuring system
27. JP 2002-132436 A FUJITSU LTD The cited prior art patents are included herein by reference.

Ultrasonic transducers for use in air usually operate at a relatively low frequency and have a narrow bandwidth, this limiting the available resolution of the system. Usually the measured time-of-flight (TOF) value is used for range computations, thus an error in time measurements results in an error in range. For example, an 1 mSec time measurement error translates into a 34 cm range error. See for example FIGS. 3A, 3B, 3C.

Signal processing may be used to somewhat enhance resolution, however this may require complex processing with its related higher cost, higher current consumption and slower response time of the graphic input device. Moreover, the device may be more sensitive to noise and the components' parameters. Anyway, there is a limit to the achievable resolution, when the starting point is a coarse measuring means.

It is known that the movement between a transmitter and a receiver generates a Doppler frequency and phase shift, which may be used for displacement evaluation. The displacement thus measured, however, gives no indication regarding the distance between transmitter and receiver—there is a range ambiguity. Moreover, only the value of the displacement is measured (a scalar) with no indication regarding the direction of that velocity. This may pose a problem if one desires to compute movement in useful X-Y coordinates. See for example FIGS. 1 and 2.

Height measurement is required if the device is to be used like a pen—the regular pen writes on paper when it is in contact with the paper, and ceases writing when its tip is raised above the paper. With an electronic pen, things are not so simple: prior art ultrasonic devices usually measure movement only in a horizontal plane.

Prior art solutions to the problem include, for example, sensing Up/down movements with a mechanical device, which is activated when the pen's tip comes into contact with the writing surface.

Such mechanical means may require an effort on the user's part for their activation, both a vertical activation force and an horizontal force due to friction between pen's tip and the writing surface.

Although just a tiny force may be required, one should consider the accumulating effect of these efforts, when the computer is used for prolonged time periods. Moreover, mechanical devices are prone to failure.

Furthermore, the above prior art means only gives an up/down binary indication.

It is highly desirable to measure the actual height of the pen above the writing surface. The changes in height, in real time, convey important information the user may desire to be processed in the computer. Prior art devices apparently do not provide means for fast height measurements, at a fine resolution.

Various input devices may require a special interface (hardware) and/or software, and may not be usable or compatible with existing software. This may limit the usefulness of these devices, especially for use at home or by people who are not computer experts.

An activation button, or a plurality thereof, may be desired, to provide a function akin that of the buttons in the PC mouse. When using a pen-shaped, high-resolution input device such as that in the present invention, pushing a mechanical button may create a noticeable disturbance in the precise pen's location or movement. The handwriting or drawing may include a mistake, or the wrong icon may be activated on screen.

Prior art high performance devices, such as digitizers, carry a high price and may be bulky.

It is an objective of the present invention to provide for a graphic input device with means for overcoming the above-detailed, as well as other, deficiencies.

DISCLOSURE OF INVENTION

The present invention provides for a graphic input device which uses noncontact displacement measurements by ultrasonic (US) waves propagating in the air, for effortless writing and drawing.

Fast and precise measurements are achieved, by measuring the phase difference between the transmitted and received ultrasonic waves.

The device is pen-shaped to allow ease of use and natural handwriting and drawing, similar to using a pen. It can be used like a pen, with pen height measurements facilitating an easy, natural interface with the computer.

It measures displacement of a pen-shaped device about a writing surface, together with precise measurement of height or changes in the pen's height relative to the writing surface.

The device may be used to enter drawings, handwriting or other information into a computer, and/or as a pointing device.

It has a fast response, to allow interactive operation with a computer—natural writing on a computer screen or pointing at a desired icon, wherein a pointer on the screen moves promptly in response to pen's movements. It has a low cost, simple structure.

The device can operate either in two- (2D) or three dimensions (3D). Measuring the changes in height (3D), in real time, can facilitate handwriting recognition.

Oriental characters recognition is facilitated by the height measurement. For example in Kangi, which has about 7,000 characters, height provides useful clues to pattern recognition of these characters.

The new input device operates with almost zero force, since there is no friction and no balls to roll. Rather, the device uses US waves propagating in the air—no continuous contact with the writing surface is required.

A zero force button on pen is disclosed, which allows activation of various functions, without disturbing the precise pen's location or movement.

The new device can directly replace the mouse now in use, with no changes in the computer or interface—the new device can emulate the mouse, in its 2D mode. Either the serial or parallel interface may be used, or USB. Height can be converted into button activations in this mode. Presently used mouse protocols can be also used with the new device, which is faster and more precise than the mechanical mouse.

In the 3D mode, height information is also transmitted to the computer, and can be used by applications (software) which are capable of using this additional information.

In a preferred embodiment, ultrasonic means are both used for displacement measurement and height measurement. A synergetic effect is achieved, for providing a high performance input device in a simple structure, at a relatively low cost.

Furthermore, where required, the same ultrasonic means can also be used for a coarse measurement of the pen's location.

System and Method of Operation of a 2D Graphic Input Device

A. pen-shaped pointing device moving about a writing surface and using ultrasonic (US) waves propagating in the air to measure displacement.

B. for each of a first and second directions in space, each being generally parallel to the writing surface, do the following:
 B1. establish an US waves path between an US transmitter and an US receiver, wherein at least one of them (transmitter or receiver) is located on the pen. Use means for isolating this waves path from the other waves path (in the other direction in space).
 B2. measure changes in the phase of the received signal
 B3. compute displacement, which is proportional to the change in phase, after correcting for overflow at the 0-360 deg. transition.

C. compute displacement in fixed, orthogonal (x,y) coordinates from the above-computed displacements. Eliminate or reduce undesired interrelations between displacement readouts in the two directions.

D. output displacement results (x,y). Using suitable Interface means i.e., results are transferred in real time to a computer using standard interface, for example to emulate the PC mouse.

System and Method of Operation of a 3D Graphic Input Device

I. pen-shaped pointing device moving about a writing surface and using ultrasonic (US) waves propagating in the air to measure displacement.

J. for each of a first and second directions in space, each being generally parallel to the writing surface, do the following:
 J1. establish an US waves path between an US transmitter and an US receiver, wherein at least one of them (transmitter or receiver) is located on the pen. Use means for isolating this waves path from the other waves path (in the other direction in space).
 J2. measure changes in the phase of the received signal J3. compute displacement, which is proportional to the change in phase, after correcting for overflow at the 0-360 deg. transition.
K. for a third direction in space, which is generally normal to the writing surface, do the following:
K1. establish an US waves path between an US transmitter and an US receiver, wherein both of them are located on the pen.
K2. measure changes in the phase of the received signal
K3. compute displacement, which is proportional to the change in phase, after correcting for overflow at the 0-360 deg. transition.
L. compute displacement in fixed, orthogonal (x,y,z) coordinates from the three above-computed displacements. Eliminate or reduce undesired interrelations between displacement readouts in the first two directions. Correct results in the first two directions according to results in the third direction. Compute Zinfo, information derived from the third direction in space.
M. output displacement results (x,y,z) or (x,y,Zinfo). Using suitable Interface means i.e., results are transferred in real time to a computer using standard interface, for example to emulate the PC mouse. Optionally augmented with height info.

Various novel features will become apparent to the reader, both in the above System and Method, as well as in the various embodiments thereof as detailed in the present disclosure.

Three basic Embodiments are detailed, by way of example, for the above System and Method:
E1. Embodiment 1: Transmitter on pen, two or more receivers at fixed locations about the writing surface. In another implementation, the receiver is on pen, with two or more transmitters at fixed locations.
E2. Embodiment 2: Both transmitter and receiver on pen, with writing surface reflecting back US waves towards pen. Writing surface has a measure of roughness.
E3. Embodiment 3: Both transmitter and receiver on pen, with two lateral reflecting surfaces near the edges of the writing surface. Using normal reflection from the lateral surfaces, each like a mirror.

The above and other objectives are achieved by the innovative graphic input device and method provided by the present invention.

BRIEF DESCRIPTION OF DRAWINGS

The invention is herein described, by way of example, with reference to the accompanying drawings, wherein.

MODES FOR CARRYING OUT THE INVENTION

A preferred embodiment of the present invention will now be described by way of example and with reference to the accompanying drawings.

Abbreviations
3D—tri-dimensional
c—velocity of US waves in air, about 340 m/sec
CAD—computer-aided design
CAE—computer-aided engineering
cm—centimeter
CW—continuous wave
DPI—dots per inch
FM—frequency modulation/frequency modulated
INF=Infinity
IR—infrared
kHz—kiloHerz
mSec—millisecond
mm—millimeter
PC—personal computer, for example a Pentium IBM-made or IBM-compatible computer. Otherwise, the application may include laptops, palmtops or other types of computer devices. Other devices that accept graphic inputs from a user may also be included.
US—ultrasonic
WL=wavelength of US waves in air, about 8 mm at 40 kHz Note: While detailing one aspect of the invention with reference to a specific figure, the description may occasionally refer to another drawing, to provide a more complete view of the multifaceted present invention. This should not be regarded as limiting the invention to that specific combination of drawings. Rather, these references are by way of example only; various combinations of the novel features in the present disclosure are possible and will become apparent to a person skilled in the art, upon reading the present disclosure.

Figure 1:
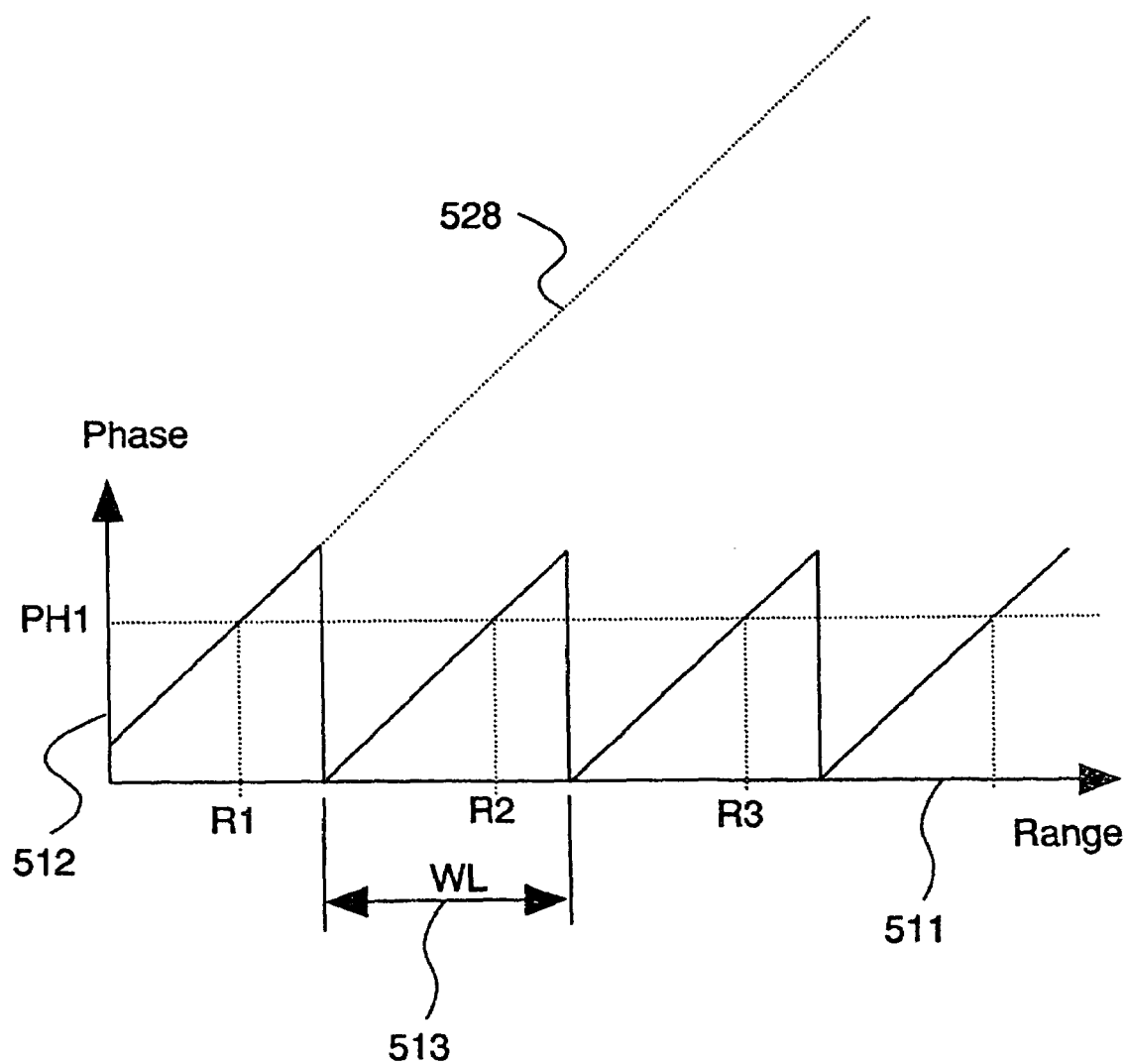
FIG. 1 Range ambiguity arising from phase measurements, and a method for its correction.
Figure 2:
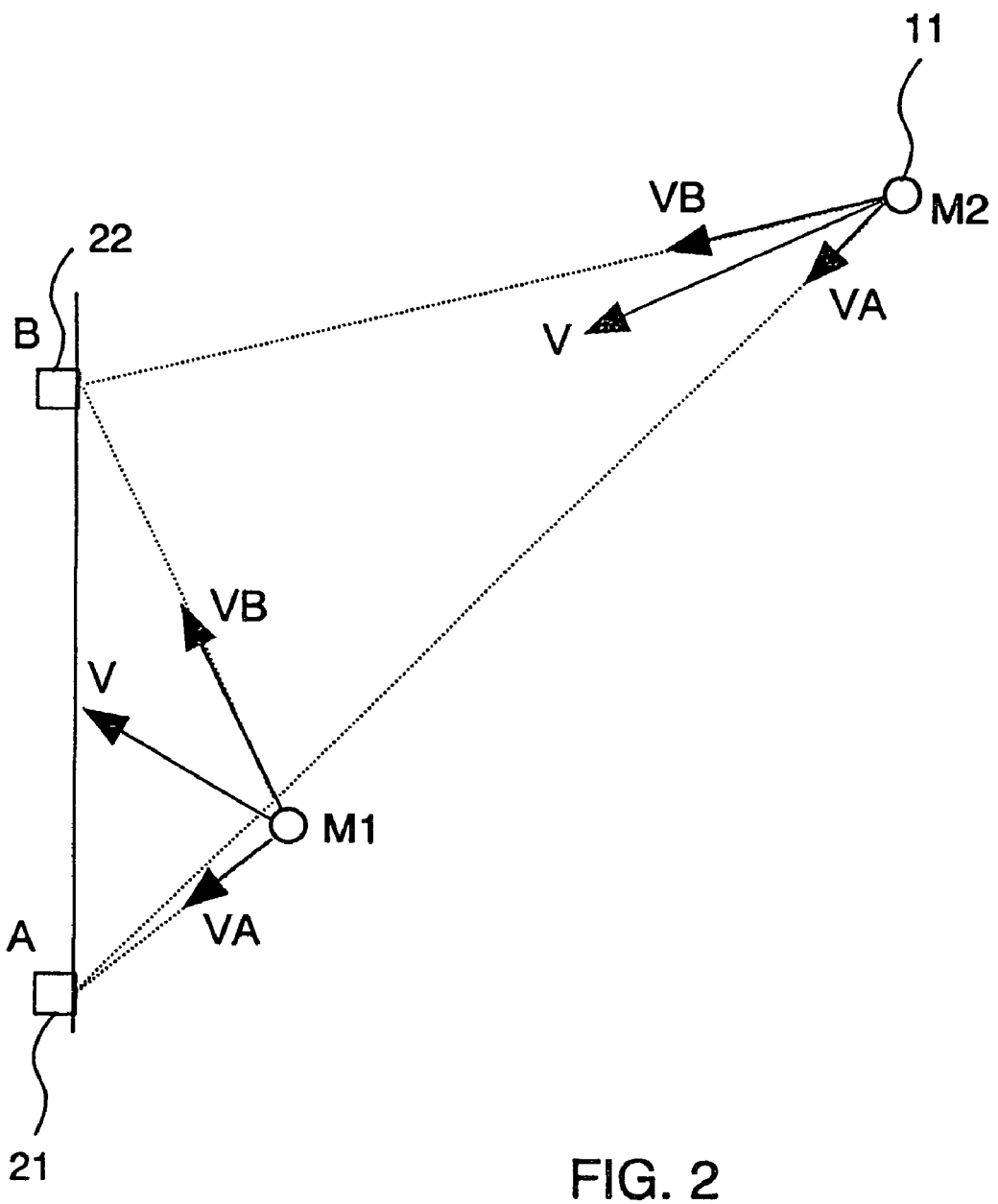
FIG. 2 Velocity ambiguity arising from Doppler measurements using two receivers.

The outline of the invention disclosure is generally as follows:

FIGS. 1 to 3 illustrate signals in graphic input devices and basic approaches to their interpretation.

Figure 4:
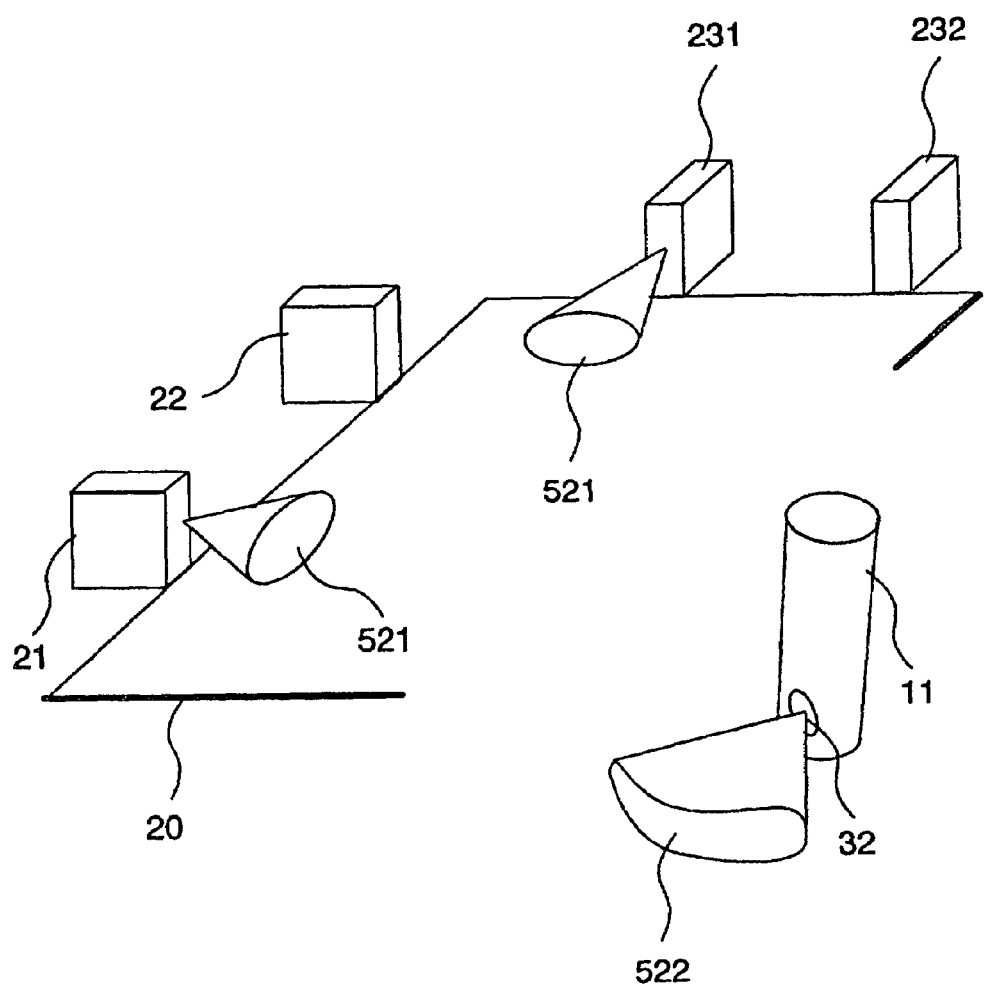
FIG. 4 Digitizing pen system with transmitter on pen and static receivers.

From FIG. 4—a preferred embodiment (E1) of a digitizing pen system is presented, with an US transmitter on pen and using static receivers.

Figure 11:
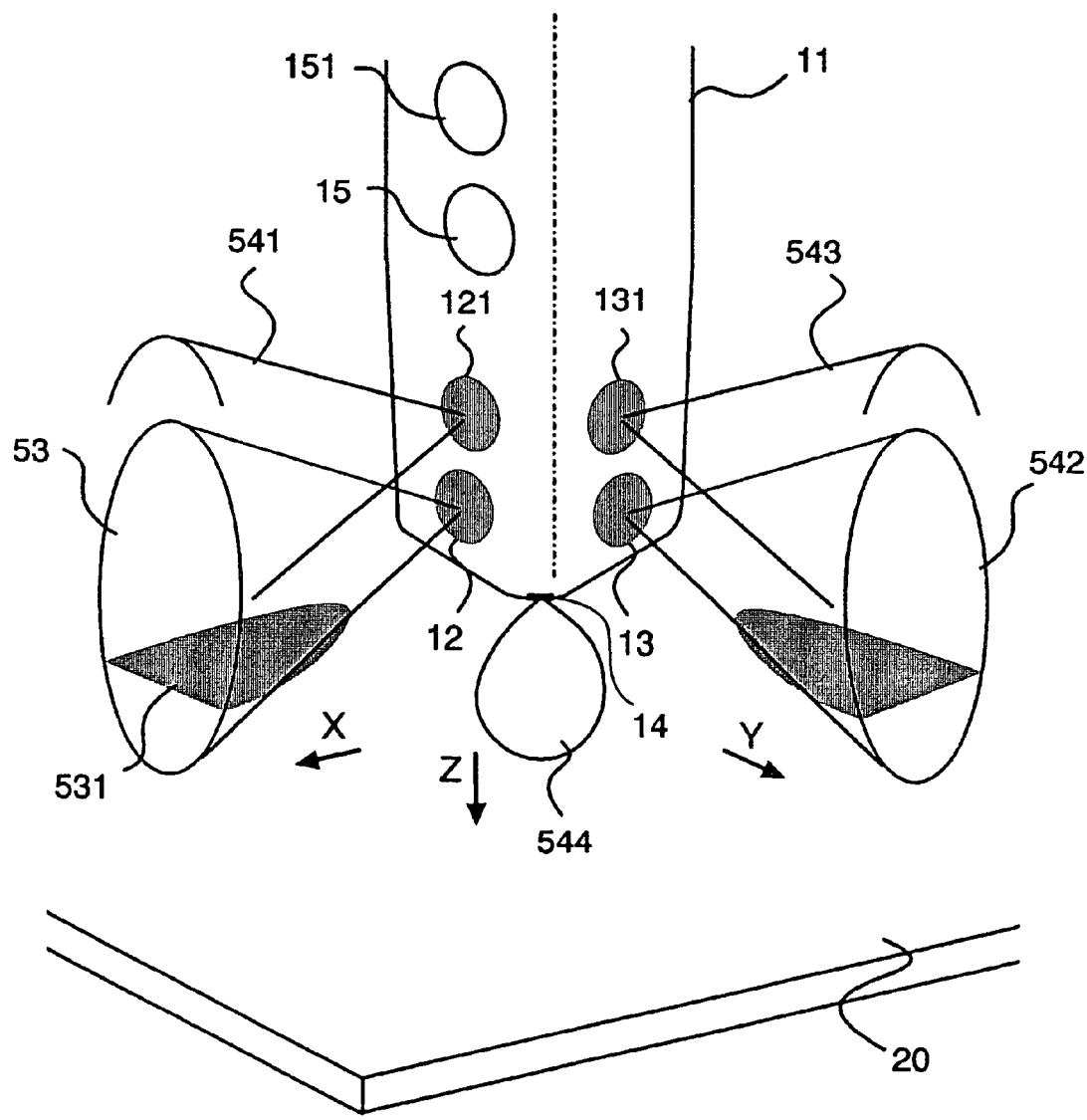
FIG. 11 Digitizing pen system with transmitter and receiver integrated in the pen and using the writing surface as a waves reflecting surface.

From FIG. 11—another preferred embodiment (E2) of a digitizing pen system, with the US transmitter and receiver integrated in the pen and using the writing surface as a waves reflecting surface.

Figure 19A:
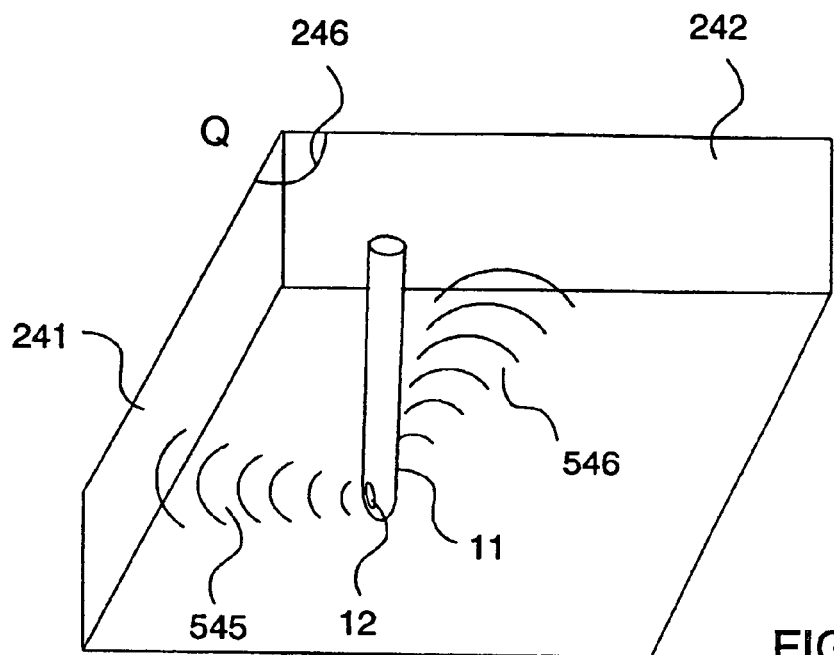
FIGS. 19A, 19B Digitizing pen system with transmitter and receiver integrated in the pen and using lateral waves-reflecting surfaces at the edges of the writing surface.

From FIG. 19A—yet another preferred embodiment (E3) of a digitizing pen system, with the US transmitter and receiver integrated in the pen and using lateral waves-reflecting surfaces at the edges of the writing surface.

Figure 22:
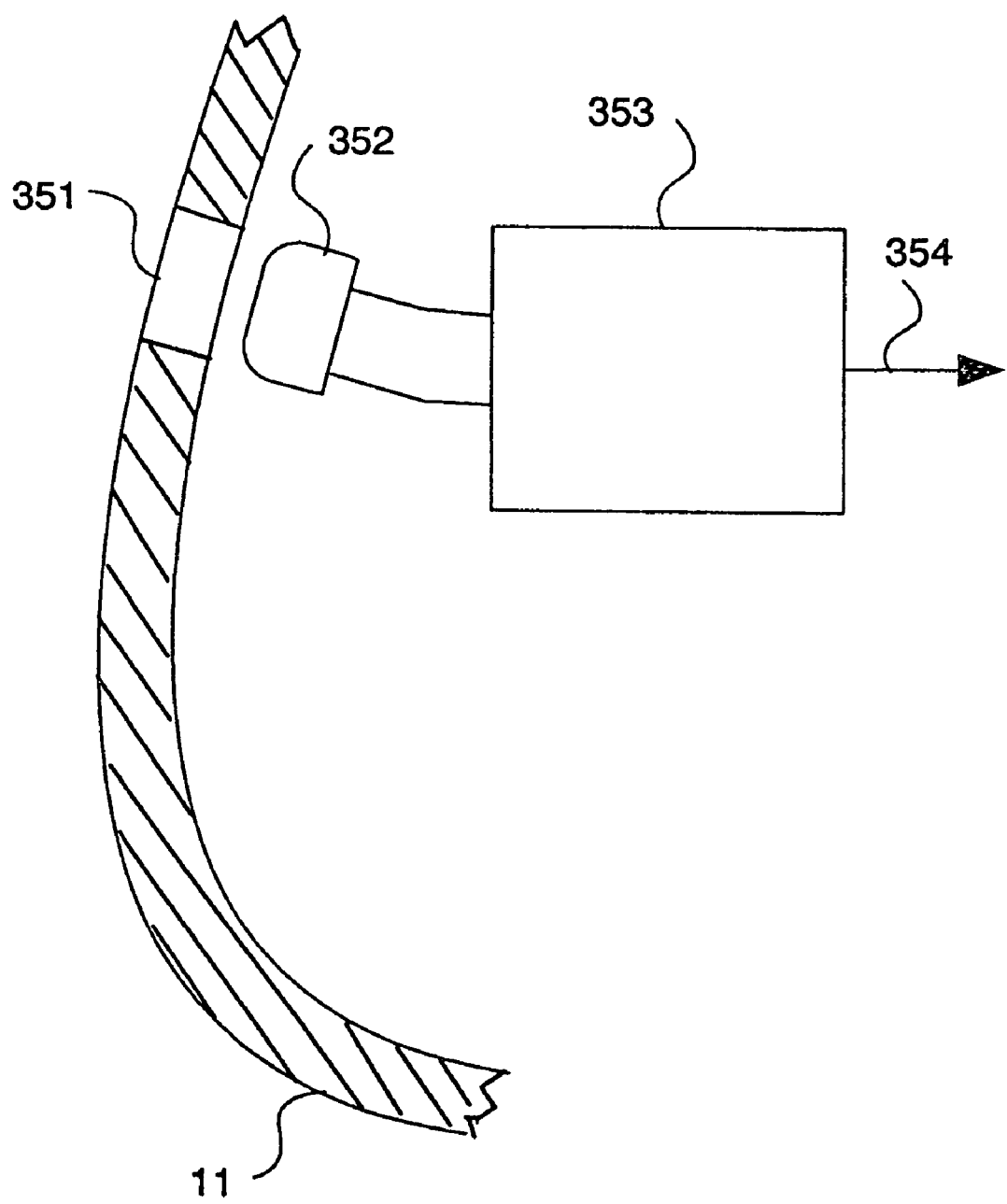
FIG. 22 A zero force button on pen

The following features, which are also part of the present disclosure, can be used with the various pen system embodiments, unless otherwise indicated:

FIG. 22 details a zero force button on pen. It is also detailed elsewhere in the application, see FIG. 11 for example. This feature can be used with the various embodiments of the digitizing pen system mentioned above.

Figure 23:
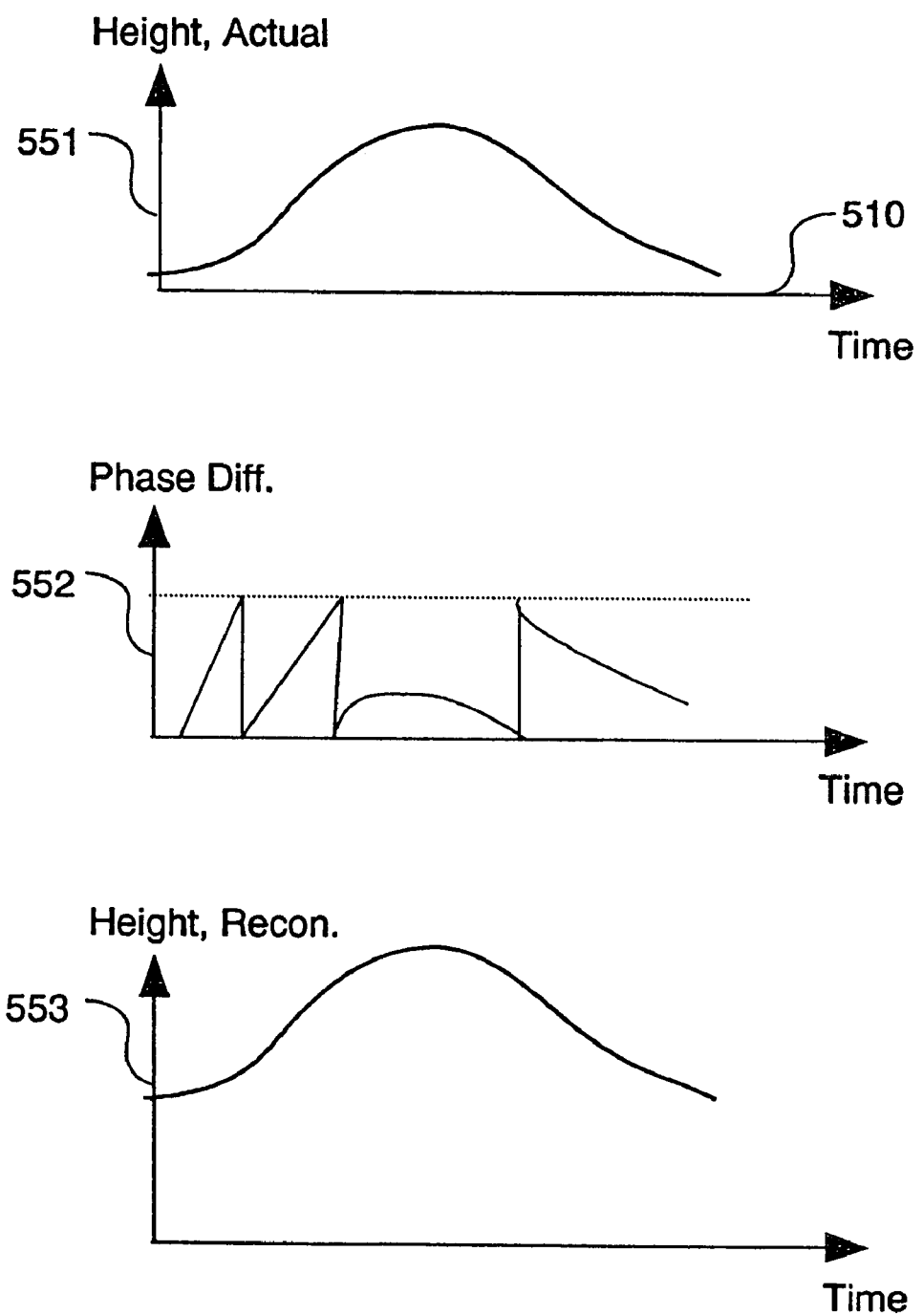
FIG. 23 Height measurement signals and the ambiguity effect.

From FIG. 23—height measurement and its uses in the new graphic device. Also detailed elsewhere in the application, see FIG. 11 for example.

FIG. 1 illustrates the range ambiguity arising from phase measurements: for a given range 511 (the distance between an US transmitter and its corresponding receiver), there is a value of phase 512, the phase difference between the transmitted signal and the received signal. Unless otherwise stated, this is the phase between the electrical transmit signal 514 (before the transmit transducer) and the electrical received signal 516 (at the output of the receive transducer) see FIGS. 3A, 3C.

Although the phase PH1 (512) is a linear function of range 511, its maximal value is 2PI radians (360 degrees), thus the function has an overflow at the 0-360 deg. transition, as illustrated. For a specific phase value PH1 as illustrated, there is an infinite set of possible range values R1, R2, R3 . . . , separated by a one wavelength distance WL therebetween. The wavelength (WL) 513 of US waves in air is about 8 mm at 41 kHz.

The total displacement may be computed by correcting for the overflow at the 0-360 deg. transition as illustrated, to form a virtual phase 528, which is an extension of short-range phase, to transcend the 360 deg. of phase limits in the real world.

The above refers to displacement measurements in only one dimension. For bi-dimensional measurements, things are more complicated. FIG. 2 details the velocity ambiguity arising from Doppler measurements using two fixed receivers, including the US receivers A (21) and B (22) at fixed locations, and an US transmitter in pointing pen 11.

It is illustrated that the actual velocity V of a moving transmitter cannot be calculated from the measured radial velocities Va, Vb with respect to the receivers A and B. Let us assume a transmitter moving such as to result in a radial velocity Va relative to receiver A, and a radial velocity Vb relative to receiver B. Two cases are illustrated, corresponding to the transmitter being located at location M1 and at location M2. Although the absolute value of Va, Vb is the same in both cases, the resulting velocity V is different in each case, both in its magnitude and its direction.

It is known in the art that the velocity of an US transmitter relative to a receiver can be computed from the measured phase shift of the received signal, using the Doppler effect. This one-dimensional relationship, however, is of little practical use in a bi-dimensional graphic input device, where the velocity V (relative to static, orthogonal x-y coordinates) is to be found. The measured velocity Va or Vb is a scalar, with no clue regarding the direction of that velocity.

In other words, using two receivers A and B resolves the transmitter movement into two velocity components Va and Vb, wherein the direction of the unit vectors for Va and Vb is unknown. As the transmitter moves over the writing pad, there is a change in the direction of the unit vectors for Va and Vb. It is required to transform movement from coordinates (Va, Vb) to orthogonal (x,y) coordinates, wherein the direction of the coordinates Va, Vb themselves is not fixed, but changes with time.

It is not practical to assume a known location for the transmitter. A fixed location is just contradictory to the concept of a free moving pen. In a practical, useful input device, the system has to allow the user to raise the pen from one location and to lower it at another.

Figure 3A:
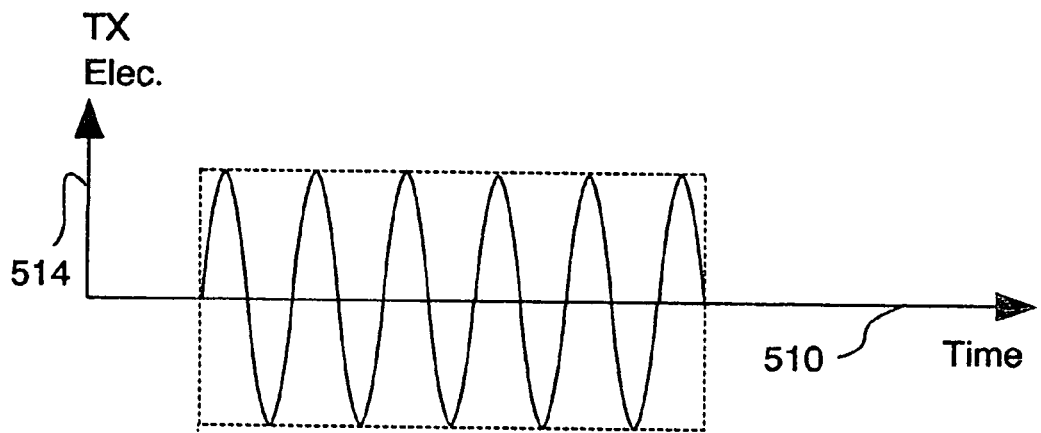
FIGS. 3A, 3B, 3C Time-of-flight measurement error due to narrowband transducers.
Figure 3B:
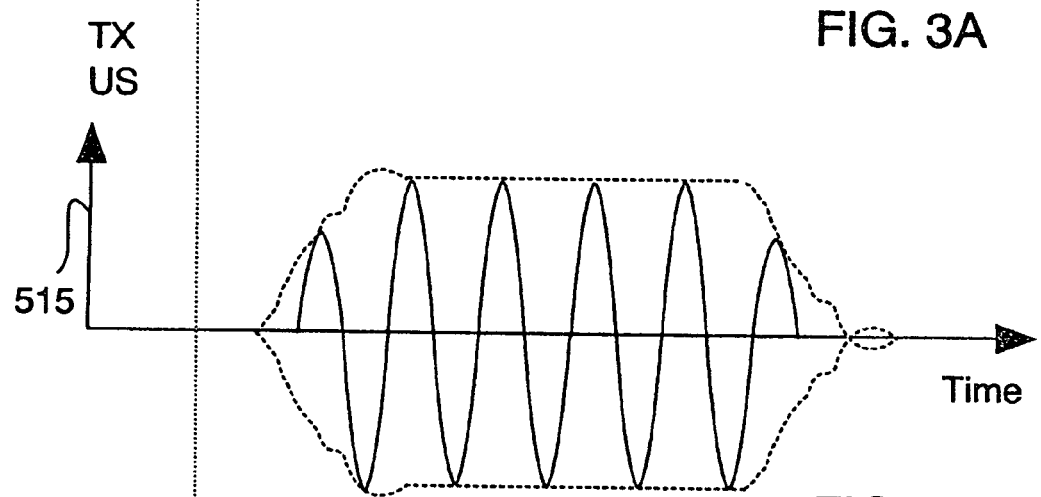
Figure 3C:
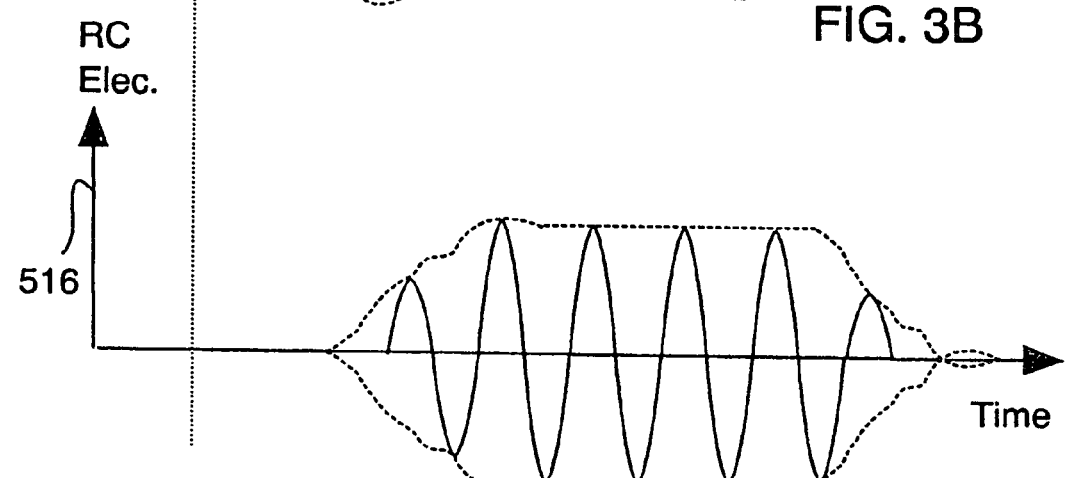

FIGS. 3A, 3B, 3C illustrate Time-of-flight (TOF) measurement error due to narrowband transducers. Usually, a square pulse envelope is assumed for the transmitted and the received signal. Actually, although the electrical transmit signal may have that desirable envelope, the transmitted US wave has a nonzero risetime, due to bandwidth limitations of the transducer. A narrow frequency response is equivalent to a slow transducer response in the time domain. The electrical transmit signal 514 (before the transmit transducer) is assumed an ideal ultrasonic pulse versus time 510, having a square wave envelope.

The US transmitted wave (pulse) 515 (at the output of the transmit transducer) has a finite rising time, that may deviate from an ideal transient due to complex resonances in the transducer, noise, etc. The electrical received signal 516 (at the output of the receive transducer) has a further deteriorated waveform, caused by the second (receiver) transducer.

In a practical implementation, the risetime of waveform 516 may be of the order of 1 mSec. There is a further error in the subsequent electronic decision circuit, which has to decide the location in time of the leading edge for the above received pulse 516. These accumulated errors may result in a large error in estimating TOA and range.

Thus, leading edge deterioration of the transmit pulse is to be expected, due to limited transducer bandwidth and noise. As the US wave reaches the receiver, the time response of the receiver transducer will further affect the leading edge of received pulse. Thus, there is an uncertainty in the measurement of time-of-flight for the ultrasonic wave, due to transducers' response and noise, inter alia. This time measurement error will result in an error in the range measurement.

Note: although a pulsed transmission is illustrated here for presenting the concepts involved, the preferred waveform used in the present invention is a CW (continuous wave) waveform, unless explicitly stated otherwise.

FIG. 4 illustrates one implementation of the Embodiment (E1) of the present invention, using a US transmitter on pen and US receivers at fixed locations.

A minimal structure requires one US transmitter on pen 11 and two static US receivers 21, 22. Phase difference detector means measure the phase difference between the transmitted signal and the signal received in each receiver. The pen's displacement relative to each receiver is proportional to the phase change detected in that receiver. The system also includes means for measuring a coarse pen location. The pen displacement in fixed (x,y) coordinates can be computed from the displacement relative to the two receivers and the known pen's location.

The pen 11 is intended to move on or close to the surface 20, in a generally horizontal plane. Its transmit pattern 522 is preferably wide in a horizontal plane and narrower in a vertical plane, as illustrated, preferably wide enough to reach the receive transducers where they may be located on writing pad 20, as illustrated.

Such a US radiation pattern can be generated at the transmit transducer 32, which is located near the tip of pen 11, using a transmit aperture which has a height dimension which is larger than its width. For example, the height of the transmit aperture may be one wavelength or more, with its width about half a wavelength or less. Other US pattern shaping means may be used to achieve the preferred radiation pattern. An array of several transmit elements, or a distributed source may be used, for example.

US receivers 21, 22, 231, 232 can be fixedly located at the edges of the pad 20, with each receiver preferably having a US radiation pattern 521 as illustrated: a pattern wide in a horizontal plane, and narrower in a vertical plane. This radiation pattern is better suited for receiving US waves transmitted by pen 11, which is expected to move on or close to the surface 20, in a generally horizontal plane.

Such a US radiation pattern can be generated at the receiver's transducer using a receive aperture which has a height dimension which is larger than its width. For example, the height of the receive aperture may be one wavelength or more, with its width about half a wavelength or less. Other US pattern shaping means may be used to achieve the preferred radiation pattern. An array of several transmit elements, or a distributed source may be used, for example.

The writing pad 20 is a planar, smooth surface. The pointing means 11 is a pen-shaped pointing device with a ultrasonic (US) transmitter near its lower end or tip, to transmit US waves in the air. The system further includes at least two US receivers located at the edges of the writing pad, used to receive the transmitted US waves and to measure the phase difference between the transmitted signal and the received signal. As the pen moves, the phase difference changes, due to the Doppler effect, as illustrated in FIG. 1.

A precise displacement measurement can be achieved. For example, using about 41 kHz US waves and 128 phase values per cycle, a good resolution of about 0.065 mm can be achieved, or about 390 DPI.

In the present invention, a pen's displacement is computed from the measured phase changes in the received signal.

Figure 5:
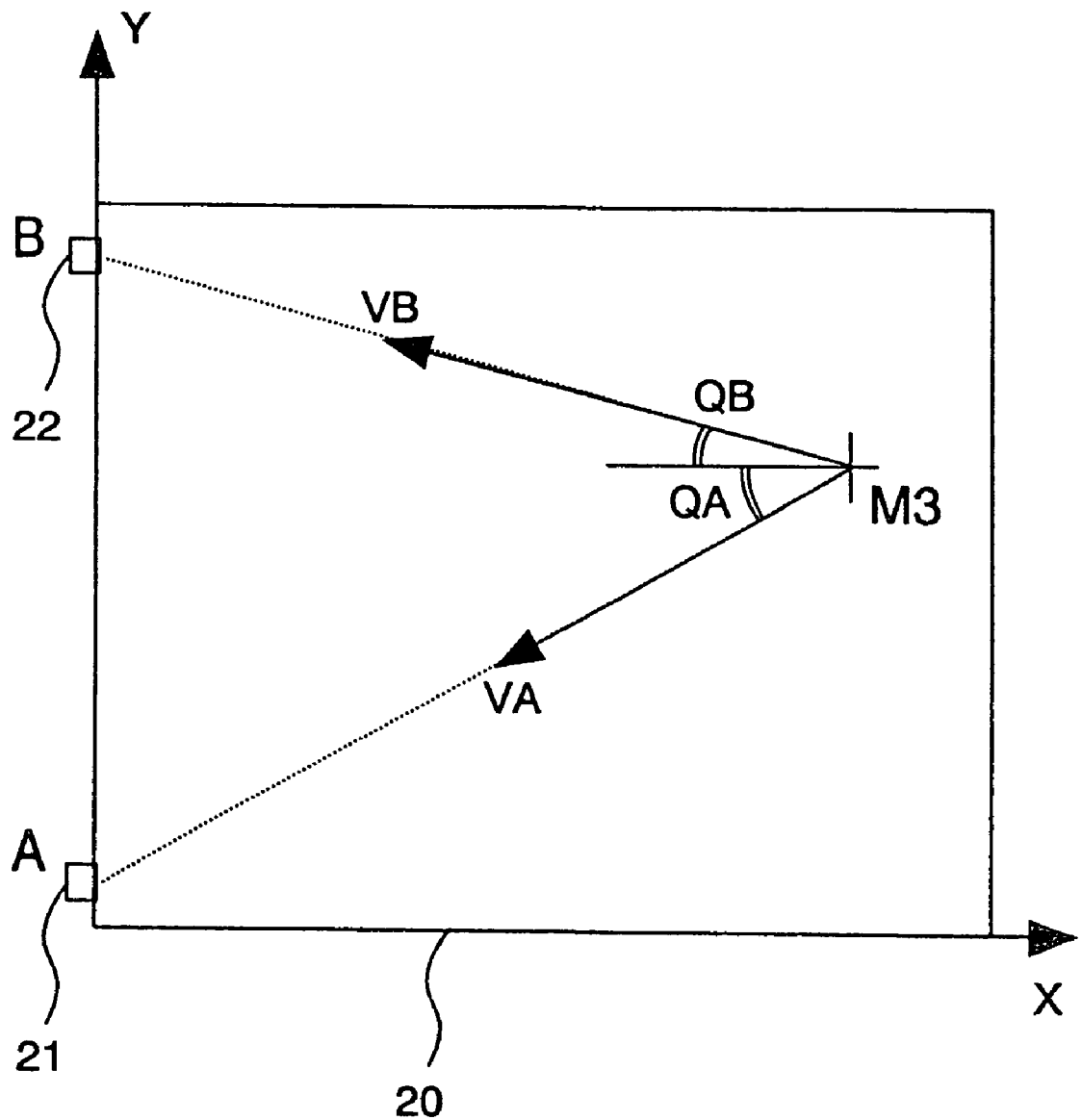
FIG. 5 Method of displacement computation, using the coarse location and Doppler shift measurements.

In the embodiment (E1) as presented in FIG. 4, additional means are required for measuring the angles Qa, Qb at which the pen is seen from the fixed receivers A,B (see FIGS. 2, 5). Here, these angles are depicted as the angle beteen velocity vectors Va, Vb and the horizontal x axis.

The angles Qa, Qb can be computed from the known coordinates of the point M2 or M3 where the pen is located at a given instant. Means for measuring in real time the location of the pen, or at least a coarse location of the pen, are provided. The x- and y-axis components of the velocity vectors Va, Vb can then be computed for that location. The coordinates transformation method is further detailed with reference to FIG. 5, for example. Other embodiments presented in the present disclosure, may not need the pen location information for displacement computations.

FIG. 5 details a method of displacement computation, using the known angles Qa, Qb for the pen 11, or at least a coarse estimate of these angles, together with changes in the received phase due to the Doppler effect, during a pen's 11 movements about the writing surface 20.

The US transmitter in the pen, at location M3, transmits US waves towards the US receivers 21, 22 at the edges of the pad 20. The receivers measure each the radial velocity of the transmitter in its direction: Va towards receiver A (21) and Vb towards receiver B (22).

Assuming the location M3 of the transmitter is known, as well as the location of receivers 21, 22, then the angles Qa, Qb can be computed. Using known geometric relationships, Va and Vb can be then used to compute the corresponding x-axis and y-axis components, that is Vx and Vy, the pen velocity components in orthogonal coordinates.

Rather than velocity, the receivers can directly measure the change in the phase of the received US signal, which is proportional to pen's displacement in that direction (the direction is defined by the angles Qa and Qb).

When performing phase measurements at time intervals i, a time dt apart, difference displacement values (dx,dy) can be measured for each interval—the displacement done since the last measurement. The sum of these tiny difference displacement values is the total displacement in the x-axis and y-axis direction, respectively.

MD1. Method of Displacement Computation

1. Let us assume the pen-shaped pointing device 11 is located at location M3 as illustrated. The system measures, in real time, the coordinates of that pen's location, using means to be detailed elsewhere in the present disclosure. The angles to pen or the coarse pen location, can be measured.
2. From the known coarse pen's location M3, the angles Qa and Qb can be found. The precise pen location can be measured using prior art methods, however this may result in a high cost, complex and/or bulky implementation having a slow response time.

According to the present invention, the precise pen location needs not be measured—a coarse location will suffice.

Alternately, the angles Qa, Qb may be measured directly, maybe a coarse measurement—using an interferometer of US waves, for example. The receivers 21 (A) and 22(B) can each be replaced with a pair of receivers, to implement a phase interferometer to measure the angle of US waves from pen.

Although there may be an error in the values of the angles Qa and Qb, the resulting error is corrected by the user in the loop; otherwise, the resulting error may be tolerated for practical applications such as drawing and handwriting recognition.

3. The phase changes measured at receivers A and B are resolved into the x-axis and y-axis components corresponding to that motion, using known geometric formulas. Alternately, velocity calculations can be performed.
4. The total x-axis displacement is computed from the sum of the x-axis components of the phase change for the A receiver and that for the B receiver. The total y-axis displacement is computed using the same method.
5. The x-axis displacement is added to the previous cursor location to compute the new x-axis location. The y-axis location is updated as well. The new (x,y) cursor location is displayed to the user.

Figure 6:
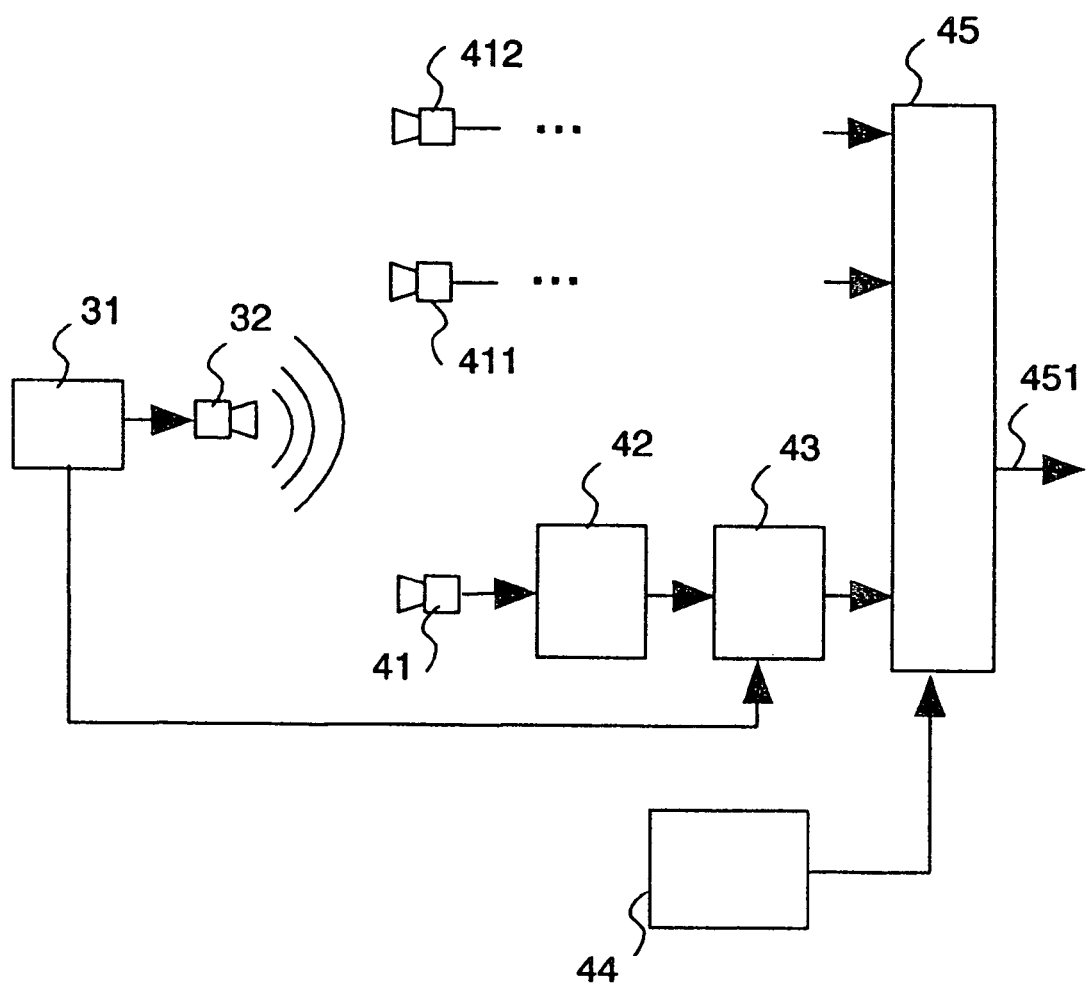
FIG. 6 Block diagram of a displacement measuring system.

FIG. 6 details a block diagram of a displacement measuring system, usable with the structure of FIG. 4 and for implementing the method of FIG. 5.

The transmitter 31 generates electrical signals at the US frequency required at the transmit transducer 32. Transducer 32 transmits US waves in air, towards US receive transducers 41, 411, 412.

Preferably a CW signal is used. In another embodiment, an interrupted CW signal may be used. Transducer 32 may be at location M3 (FIG. 5) while transmitting US waves towards the US receivers 21, 22 at the edges of the pad 20.

Each of the receive transducers generates an electrical signal responsive to the impinging US wave thereon. The signal in each channel passes through receiver and signal conditioning means 42, which may include amplifier, bandpass filter and/or other signal processing means, signal digitizer means, comparators, etc.

A phase detector means 43 measures the phase difference between the received signal in transducer 41 and a reference signal from the transmitter 31. The phase linearly changes by 360 deg. as the distance between transmitter 32 and receiver 41 changes by one wavelength.

The phase detector means 43 may be implemented using either a digital phase detector or an analog phase detector. A digital phase detector is further detailed with reference to FIG. 7. Analog phase detectors as known in the art may include a XOR logic gate, etc.

A quadrature (I-Q) phase detector may be used, wherein the reference from the transmitter 31 includes two signals at a quadrature (90 deg.) phase difference therebetween. Using the two detected components of the quadrature phase detector, the magnitude and direction of the phase change can be computed, as known in the art.

A controller 45 receives phase readings from two or more channels and transmits them over data channel 451, to a computer for example, for computing the pen's displacement in the computer. Method MD1 may be used. Alternately, displacement can be computed in controller 45.

In either case, this system requires pen location information, or at least a coarse location. Pen's location is measured in real time using the means 44 as illustrated. Examples of embodiments for means 44 are further detailed with reference to FIG. 8.

In a preferred embodiment, the same transducers 32, 41 and 411 are both used for fine displacement measurements and coarse pen location measurement, to achieve a high performance yet simple system, at a relatively low cost. Thus, phase changes are continuously measured to determine the precise displacement; changes during a transmit frequency jump are used to measure a pen's location. In other embodiments, other means may be used to measure the pen's location in real time.

In one embodiment, the transducers 41 and 411 are fixedly located as indicated for receivers A, B above, whereas transducer 412 is located on the pen, to measure the pen's vertical movements in real time. In that case, transducers 41 and 411 receive a direct wave from the transmitter 32, whereas transducer 412 receives US waves reflected about vertically from the writing surface.

Alternately, more than two receive transducers are used as illustrated below, with the controller or computer selecting two of them or using more transducers for displacement computations.

The controller 45 preferably includes means for computing the pen's displacement and means for interfacing with a computer, for example using an RS-232C serial standard.

The new device can be used to directly replace the mouse now in use, with no changes in the PC computer or its interface—the controller 45 (or the computer means 338 in other embodiments) can send the displacement information over channel 451, in the format now used for the mouse, for example:

Use a serial PC port at 1200 bits per second, 7 bit words, three byte protocol, to emulate the mouse, in its 2D mode. Either the serial or parallel interface may be used, or USB.

Height can be converted into button activations in this mode.

Thus, presently used mouse protocols can be also used by the new device. The user will benefit, among others, from a faster and more precise device.

In the 3D mode, height information is also transmitted to the computer, and can be used by applications (software) which are capable of using this additional information.

The three-byte protocol can be updated to four-bytes, with the fourth indicating the measured height, in one preferred embodiment.

Various implementations are possible for the abovedetailed Embodiment (E1), for example:

a. A transmitter in the pen, with receivers fixedly located on the writing surface. This is the basic implementation detailed with reference to FIG. 6. In one implementation the signal is concurrently received at all receivers, whereas in another implementation the receivers are sequentially scanned. A modulated signal may be transmitted, for pen location using range finding.

b. Transmitters fixedly located on surface 20 (at locations A, B for example) with a US receiver on pen.

c. Signals are transmitted from fixed locations on surface 20. A transmitter/receiver on the pen transmits back signals responsive to signals received thereon. Signals in both directions may be US waves, or IR other waves may be used in one direction and US waves in the other.

Figure 7:
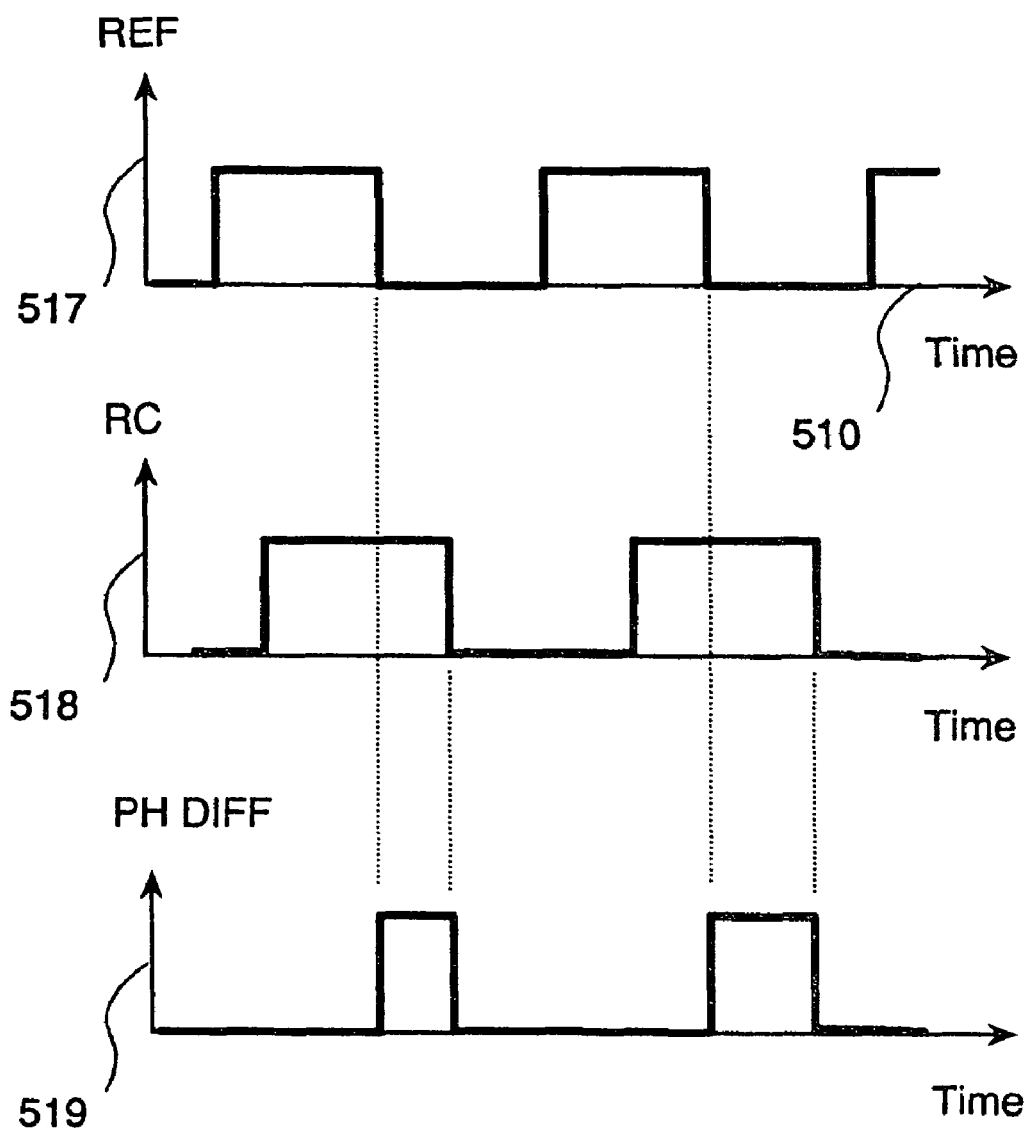
FIG. 7 Method of phase difference measurement using the Doppler frequency shift.

FIG. 7 details a method of phase difference measurement using the Doppler frequency shift. The phase detector receives at its first input the reference signal 517, which is the electrical transmit signal or a signal derived therefrom, illustrated versus time 510. The reference signal usually is at the transmitted US frequency, for example 40 kHz.

The received signal 518 (electrical signal) is applied at the second input of the phase detector. The received signal has precisely the same frequency as the reference, if the pen is not moving; it has a higher or a lower frequency, if the pen is moving towards or away from the receiver, respectively.

In the example as illustrated, the received freq. is lower than the transmit, thus the phase difference increases with time.

The phase difference signal 519, or a signal indicative of that variable, can be generated; for example, a logic level signal going to high (1) value after a trailing edge of the reference 517, and returning to low (0) value after a trailing edge of the received signal 518, as illustrated. Otherwise, leading edges or similar arrangements may be used, as well as XOR gates, etc.

For a digital phase detector implementation, the signal 519 may be used as an Enable signal for a digital counter counting a fast clock, thus the final value of the counter being proportional to the time width of signal 519, that is the phase difference.

Such logic design implementations are known in the art.

In the example as illustrated, the received signal 518 has a lower frequency than the reference 517, due to the Doppler effect, this resulting in an ever increasing phase difference (widening of the pulses 519).

Preferably, the above signals are CW, to allow phase measurements all the time, at a fast rate—such as once per transmitted US cycle (i.e. 40 kHz).

The phase difference may be measured for each cycle of the ultrasonic wave, using for example a counter to measure pulse width of waveform PH_DIFF, which corresponds to the time between the trailing edge of the REF signal and that of the RC signal. The leading edge of these pulses may be used, with identical results. Other phase difference measuring means may be used as well.

The changes in the phase difference are indicative of the pen's velocity relative to that receiver. The velocity, due to Doppler effect, is:

$$Vd = c*Fx$$

Fx—the transmitted frequency

This is one of the velocity values (Va, Vb, etc.) measured at each of the US receivers.

MD2. Method of Computing Displacement

1. Measuring a pen's location in real time, at time i. Preferably at a rate of more than once per second. A coarse location can be used. Compute the angles to the receivers in use, from the pen's location and the known, fixed location of the receivers.
2. Measuring a pen's velocity relative to two fixed US receivers. Measure Va, Vb for example, relative to the receivers A(21) and B(22) in FIG. 5
3. Computing the pen's velocity Vi in fixed, orthogonal coordinates (x,y), based on the measured velocity components Va, Vb. The coordinates transformation is performed using the measured pen's location and the corresponding angles Qa, Qb to the receivers. Each of the measured velocities Va, Vb is resolved into its x,y components, and the total x,y velocity is found as known in the art.
4. Computing the pen's displacement as the sum of small, finite segments of a velocity Vi during a time increment deltaT; or of finite displacements corresponding to small phase shifts during time intervals deltaT.

SL1. System and Method for Measuring the Angles Qa, Qb

In Embodiment (E1), it is necessary to find the angles Qa, Qb of the velocity vectors measured towards the fixed locations A(21), B(22).

These angles can be measured or computed in real time, using various means. A possible system and method comprises measuring distances from each of the locations A(21), B(22) to the pen.

Figure 8:
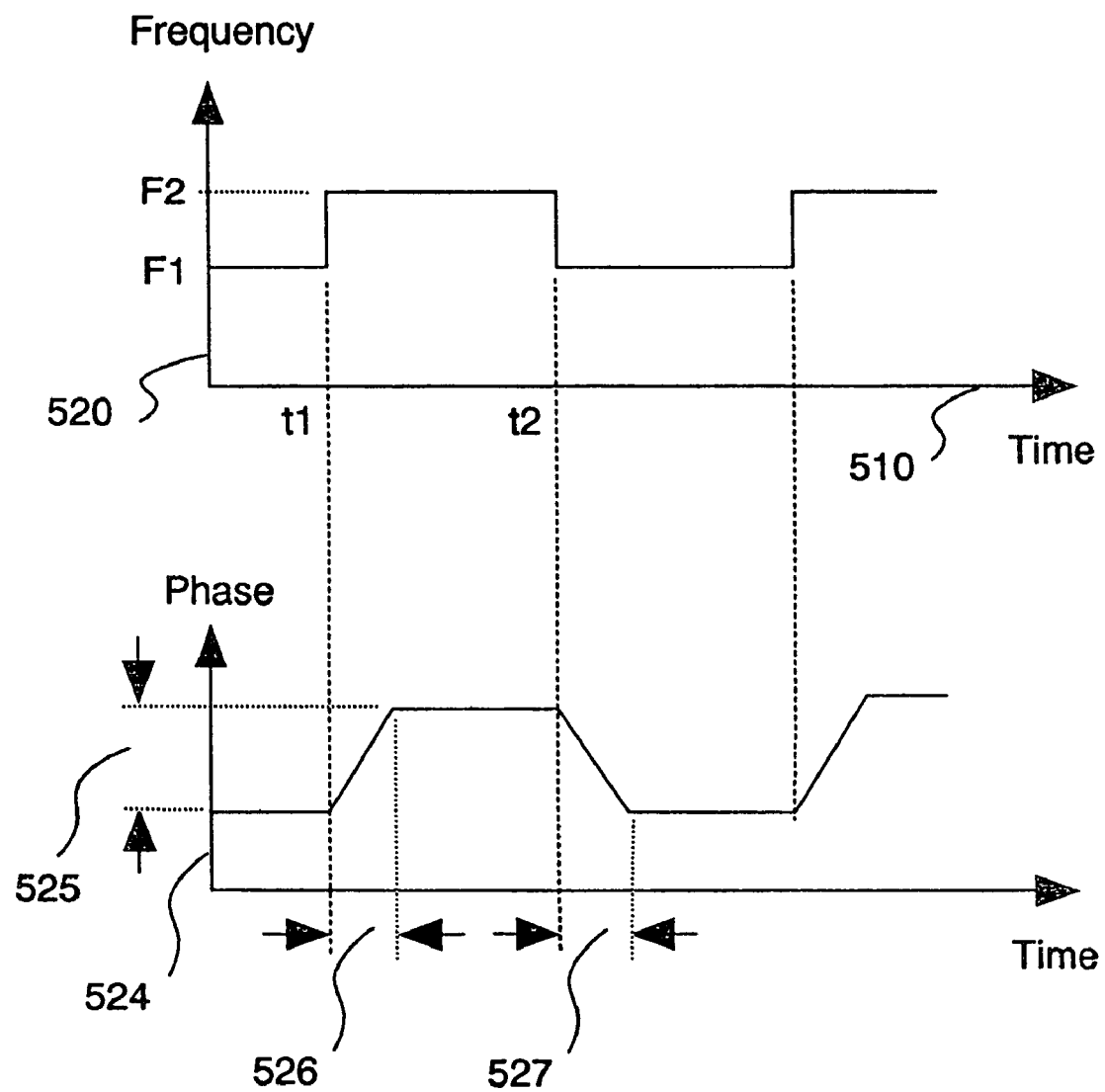
FIG. 8 Method of coarse range measurement using a frequency modulated transmission.

FIG. 8 illustrates a method of coarse range measurement using a frequency modulated transmission.

Preferably, the transmitter 520 uses a continuous wave (CW) transmission rather than pulses. This allows phase measurement at a high rate—it is possible to make one phase measurement each cycle of the US signal.

It is possible to modulate the transmitted signal, for range finding purposes. Possible modulation schemes include frequency modulation (FM), phase modulation (PM), amplitude modulation (AM), etc.

A possible FM scheme is illustrated here by way of example. The frequency of the transmitted signal 520 is alternated between two fixed values, F1 and F2. Both freq values are within the operating bandwidth of the US transducers. The transmit frequency 520 may be a square wave FM vs. time 510, possibly with a controlled phase during the freq transition.

The transmit signal, generated in transmitter 31 (FIG. 6) is also transferred, as the reference signal, to the phase detector 43 in the receiver. The reference input for the phase detector is preferably the same as the transmit frequency 520, both simultaneously changing between the two values F1 and F2.

Let us assume that, at time t1, the transmit freq. changes to F2. The reference input to the phase detector immediately changes to that value. The received signal remains the same, thus a frequency difference appears, causing the phase to change at a fast rate, determined by the difference (F2−F1). After a transition time interval 526, the new freq arrives at the receiver. The accumulated phase difference 525 is indicative of range (distance) between transmitter and receiver.

The transition time interval 527 is also indicative of the range between transmitter-receiver, taking into account the velocity of US waves in air. Thus, the phase difference 525 and/or the time interval 526 can be used to compute the range transmitter-receiver.

The physical process is as follows: Immediately following a frequency change, the phase detector will output a fast changing phase, since the reference is at a new frequency but the received signal is still at the previous frequency. It will take some time 526 until the US wavefront at the new frequency reaches the receiver.

That time 526 is the waves propagation time, and is proportional to the distance between transmitter and receiver.

Thus, the distance between the transmitter and a receiver can be computed from the time it takes the phase difference to settle to a new value, following a change in the transmit frequency F1−F2.

There will be two such transitions for each cycle of the FM transmit signal, as illustrated.

Rather than directly measuring the time, it is also possible to measure the phase difference 525 between the received signal at the two frequencies, as illustrated. This phase difference is also proportional to the distance between transmitter and receiver. The phase should be corrected for 2Pi overflow, as illustrated in FIG. 1, prior to the above computation.

Other methods of modulating the transmit signal can be used to attach time tags to the transmitted signal. This modulation can then be analyzed in the receiver, to measure the range transmitter-receiver. Preferably, a modulated CW is used, to allow continuous measurements of displacement, while also measuring pen's location.

Preferably, pen's location can be measured at a rate of about 1-10 times per second. This achieves both fast location updates and modest interference with the phase (displacement) measurements.

ML1. Method for Coarse Pen's Location Measurement

1. Modulating the transmitted US signal, for example using square wave FM
2. Measuring the accumulated phase change and/or the transition time in the receiver.
3. Computing the distance between transmitter and receiver, from the measured accumulated phase change and/or transition time.
4. Computing the pen's location, based on distance measurements R1, R2 to two receivers, A (21) and B (22) respectively, for example, see FIG. 5. The coordinates (x,y) of point M3 can be computed, as well as the angles Qa, Qb required for displacement calculus as detailed above.

As the location of each receiver 21, 22 is fixed and known, there is a known geometric/trigonometric relationship for computing the coordinates of the transmitter (pen 11) based on the above data.

5. While the transmitter is at any fixed frequency, measuring the pen's displacement based on the phase difference between transmitter and receiver, and the known location of the pen, using method MD1 or MD2, for example. Corrections may be performed for transients during a frequency change.
6. Repeating steps 1-4, while performing step 5 as well. Preferably step 5 is performed at a high rate (100 Hz or more), while steps 1-4 are performed at a slower rate (10 Hz or less).

ML2. Method for Coarse Pen's Location Measurement

1. The transmit freq is switched alternately between two fixed values, F1 and F2. The same frequency is fed as the reference signal to the phase detector.
2. After a freq transition, the reference freq has immediately changed by DeltaF, whereas the received frequency is still the same—it takes some time for the US wavefront with the new frequency to reach the receiver. During this time delay, the phase detector output linearly increases (or decreases) at a fixed rate, which is determined by the phase difference: the rate is $$RPH \text{ (Rate of phase change)} = 2*Pi*(F2-F1) \text{ rad/sec}$$

3. After the US wave front with the new frequency reaches the receiver, the received frequency equals the reference frequency, therefore the phase difference remains constant (except for slow changes because of pen movements).

Thus, during the time Tdel it takes the US wavefront to reach the receiver, the phase detector output accumulates a phase difference PHDiff $$PHDiff = RPH*Tdel$$

4. By measuring the accumulated phase difference PHDiff, the propagation time Tdel can be computed. The distance between transmitter and receiver is:

$$R = Tdel*c$$

c=340 m/sec approx.

Alternately, the propagation time Tdel can be directly measured, from the phase measurements in the receiver: Until the US wavefront at the new frequency reaches the receiver, the phase difference changes rapidly. The rate of change is significantly larger than that resulting from mechanical movements of the pen, thus the phase rate is identified as been caused by the different frequencies. The end of the time period Tdel is indicated by the rate of phase change going down to zero or a low value.

5. Thus, the range from pen to each receiver can be measured based on either the accumulated phase difference, the time delay Tdel or a combination thereof.

This is just a coarse range determination, because of bandwidth or noise limiting factors, as detailed above.

6. Pen location computation—as known in the art, using range to two receivers, using simple geometrical relations.

Preferably, using a controlled phase FM, that is—predefined phase at freq transition.

Figure 9:
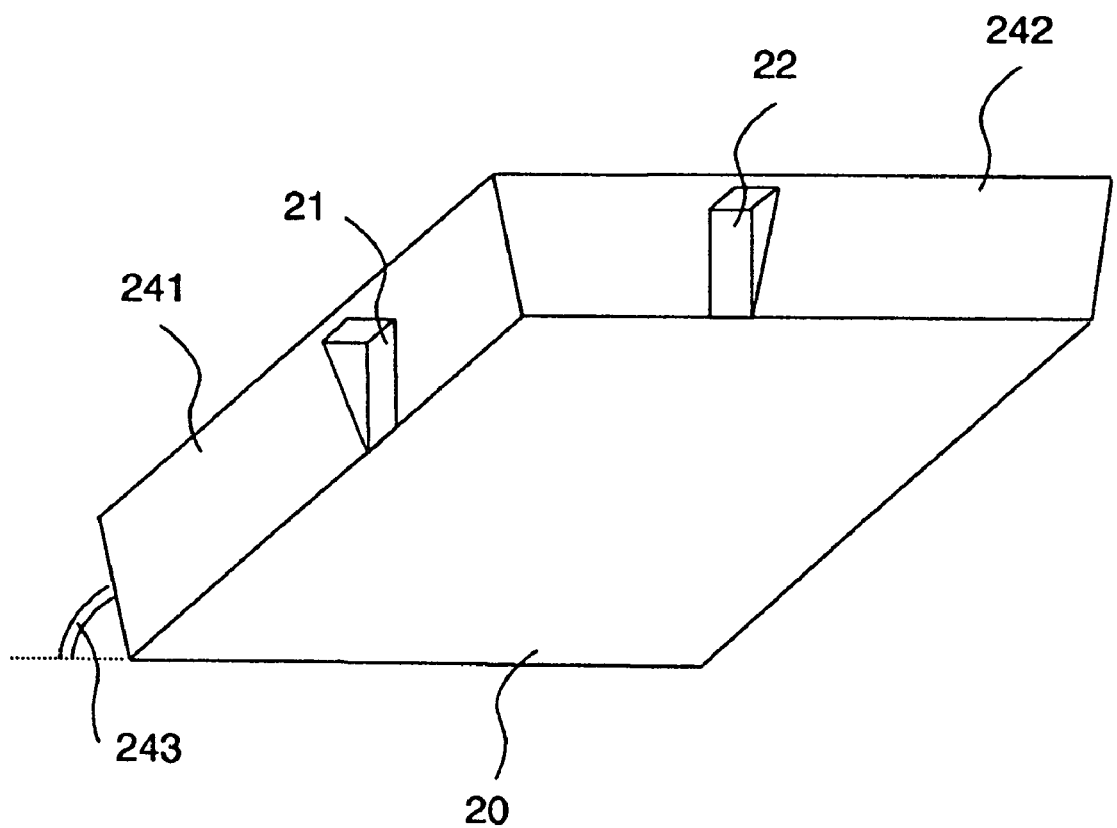
FIG. 9 Digitizer writing surface with protective side surfaces.

FIG. 9 illustrates a preferred embodiment of a digitizer surface 20 with protective side surfaces.

The US receivers 21, 22 are located at the edges of the pad 20. The lateral side surfaces 241, 242 are preferably not vertical, but inclined outwards at an angle 243 with respect to the horizontal plane of pad 20.

Thus, US waves are reflected upwards, rather than reverberate in the area confined between these surfaces. Concurrently, the structure also gives a measure of protection from extraneous waves and noise, that may enter the writing area defined therein.

Thus, the structure may protect from outside interference, while also preventing multiple reflections by using oblique surfaces, at a slant angle Q which differs from normal (90 degrees).

Figure 10A:
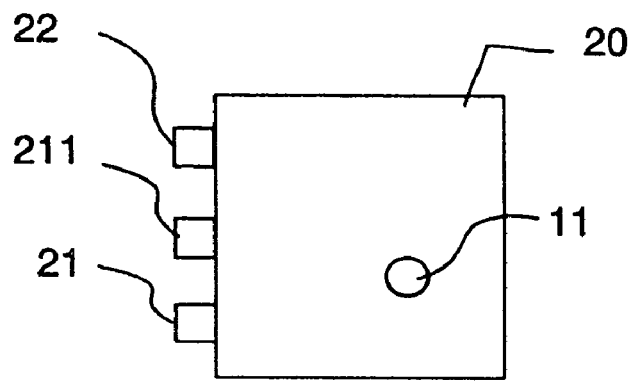
FIGS. 10A, 10B, 10C Possible receivers locations on the writing surface.
Figure 10B:
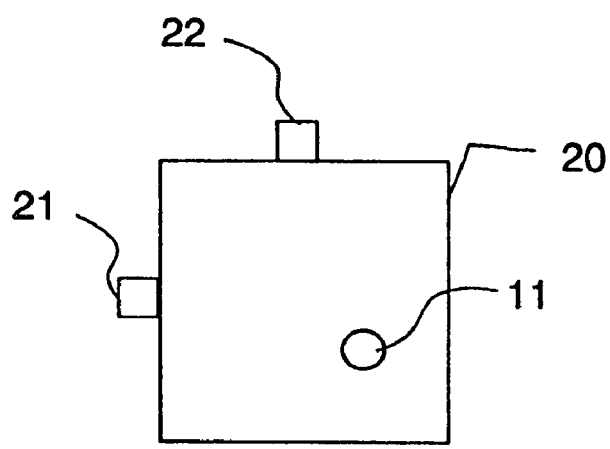
Figure 10C:
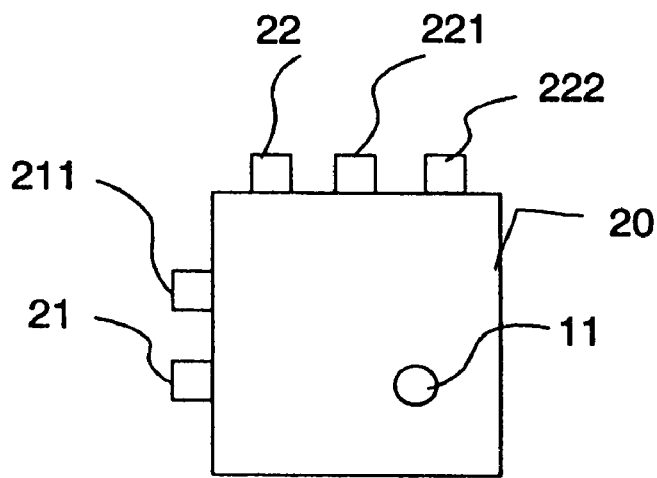

FIGS. 10A, 10B, 10C detail possible receivers locations on writing surface. A minimum of two receivers 21, 22 is required, to define a bi-dimensional coordinates frame of reference for pen displacement measurements, that can be subsequently converted into displacement in x-y coordinates. These may include receivers 21, 22 located on the same side of pad 20, as illustrated in FIG. 10A.

An additional receiver 211 can improve measurements performance. A controller can choose which pair to use from the available receivers, for best performance.

FIG. 10B indicates another arrangements, with the receivers 21, 22 each being located on a different side of the pad 20.

FIG. 10C illustrates yet another arrangement, using a plurality of receivers 21, 211, 22, 221, 222 on each side of the pad 20. The controller may choose a pair of receivers to be used at a given moment, based on the instantaneous location of the pen, for best performance. A different number of receivers than that illustrated, can be used on each side of the pad 20.

FIG. 11 illustrates another embodiment (E2) of a digitizing pen system, using a transmitter and receiver both integrated in the pen 11 and using the writing surface 20 as a waves reflecting surface.

The pen 11 includes an x-axis transducer 12, used as a transmitter. The US waves pattern 53 defined by transducer 12, transmits US waves which illuminate an area 531 on the writing pad 20 with US waves. A corresponding x-axis transducer 121, used as a receiver, has an US waves pattern 541. Thus, transducer 121 "sees" about the same area 531 illuminated with US waves, thus US waves transmitted by transducer 12 are reflected off the area 531 of the pad 20 and are received at transducer 121.

When the pen 11 moves with respect to pad 20 in the x-axis direction, then waves received in transducer 121 will have a Doppler frequency and phase shift, from which the displacement can be computed.

The operation of the y-axis is identical to the x-axis, with y-axis transducer 13, used as a transmitter. The US waves pattern 542 defined by transducer 13, illuminates the writing pad 20, the reflected waves being received at the y-axis transducer 131, having a US waves pattern 543. The transducers 13 and 131 measure displacement in the y-axis direction.

US transducers are reversible, the same directional pattern applies when the device is used as either a transmitter or a receiver. In another embodiment of the system, the upper transducer 121, 131 is used as transmitter, and the lower 12, 13 as a receiver.

One embodiment uses separate transmit and receive transducers, as illustrated above. In another embodiment, a single transducer 12 is used both as transmitter and receiver in the X direction, with another single transducer 13 being used in the Y direction.

Height measurement is possible using US transducer 14. Various embodiments thereof are possible, for example:

a. A pair of transducers is used in lieu of transducer 14, one as transmitter and the other as receiver, both oriented downwards, in a structure as detailed above for the horizontal displacement sensing.
b. Transducer 14 is used both as a transmitter and a receiver, to transmit US waves towards the pad 20 and to measure the pen 11 height based on the received returns;
c. Transducer 14 is only used as a receiver, to receive waves transmitted from one of the horizontal axes transmitters such as 12 or 13, which waves have been reflected off pad 20 upwards. Although the pattern of transmitter 12 has a generally horizontal orientation, just a small part of its transmit power is sufficient for the height measurement, due to the small distances involved—usually less than one cm, and the strong vertical reflection.

Alternately, a horizontal US transmitter may be tilted downwards to some measure, to better illuminate the surface near the pen with US waves, for height measurement purposes.

Figure 14:
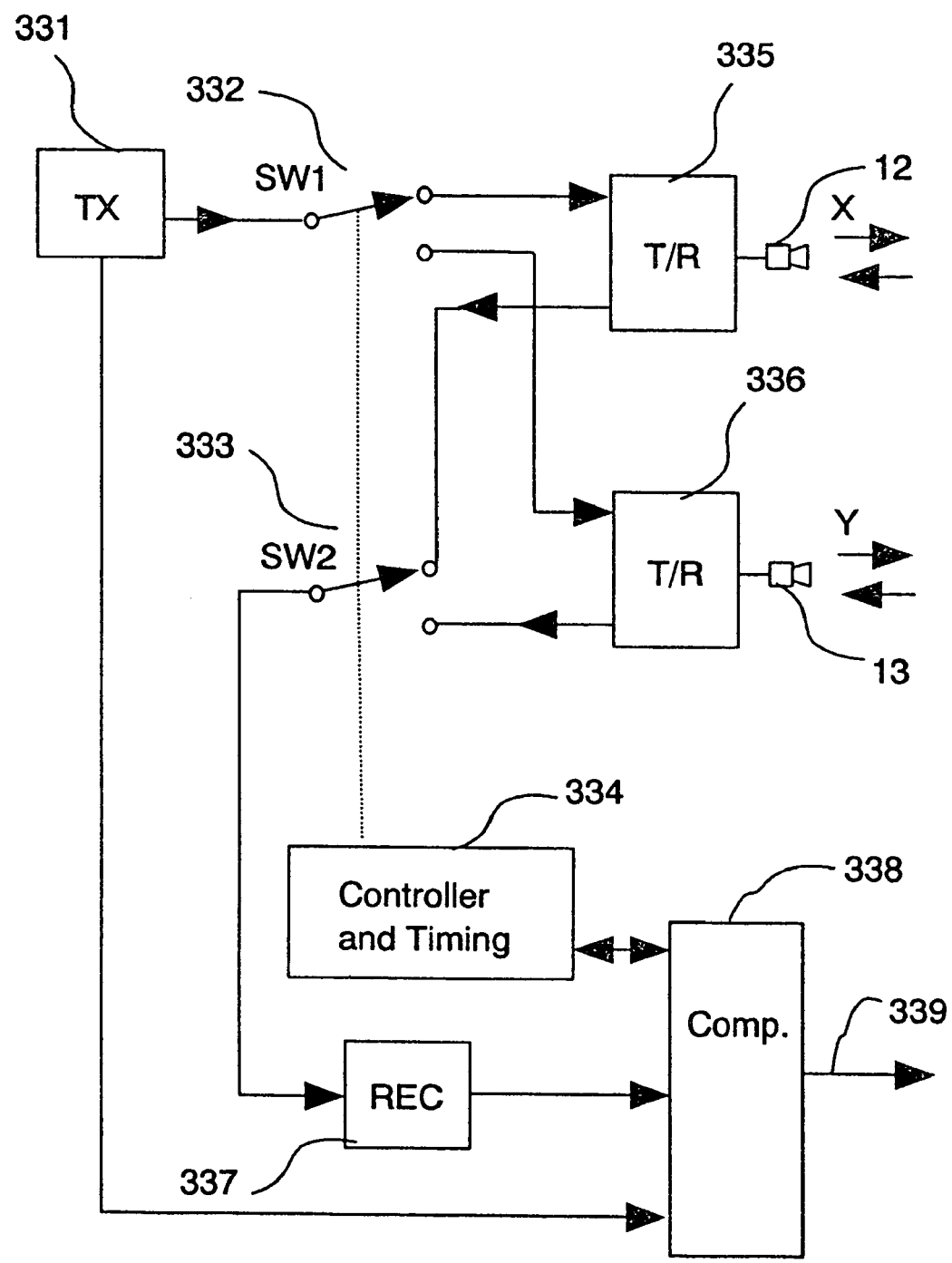
FIG. 14 Block diagram of a digitizing pen system with transmitter and receiver integrated in the pen.
Figure 15:
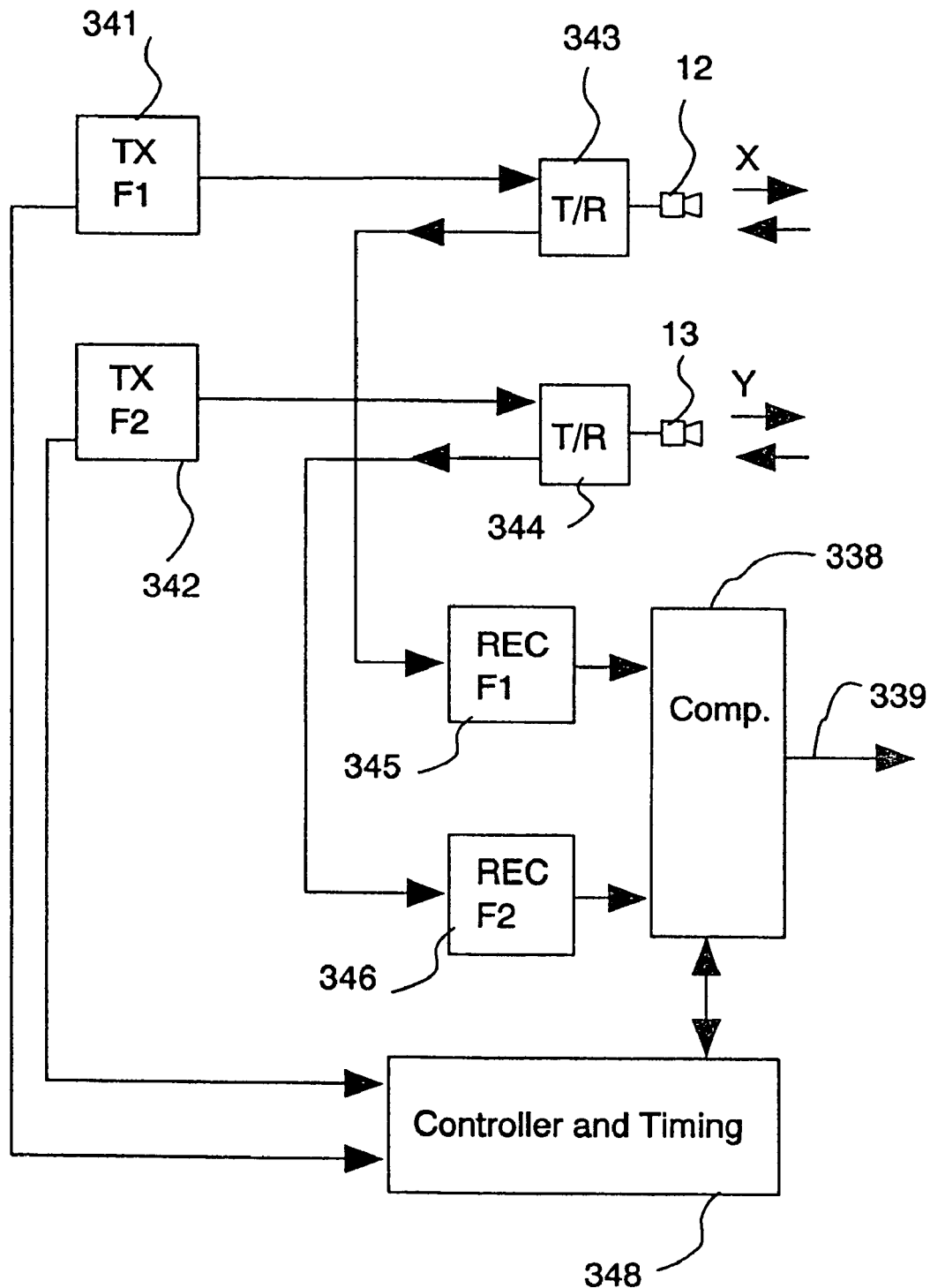
FIG. 15 Block diagram of another embodiment of a digitizing pen system with transmitter and receiver integrated in the pen.

Possible implementations of the electronics for this embodiment are detailed, for example with reference to FIGS. 14 and 15.

The pen's location is not necessary for displacement computation in this embodiment.

The pad 20 has to have a measure of roughness, in order to reflect US waves back towards the pen 11. Possible embodiments of pad 20 for this system are detailed, for example, with reference to FIGS. 16A, 16B, 16C and 17.

Optional buttons 15, 151 on the pen can be used for various applications, possibly in a way similar to the buttons in a computer mouse.

Figure 12:
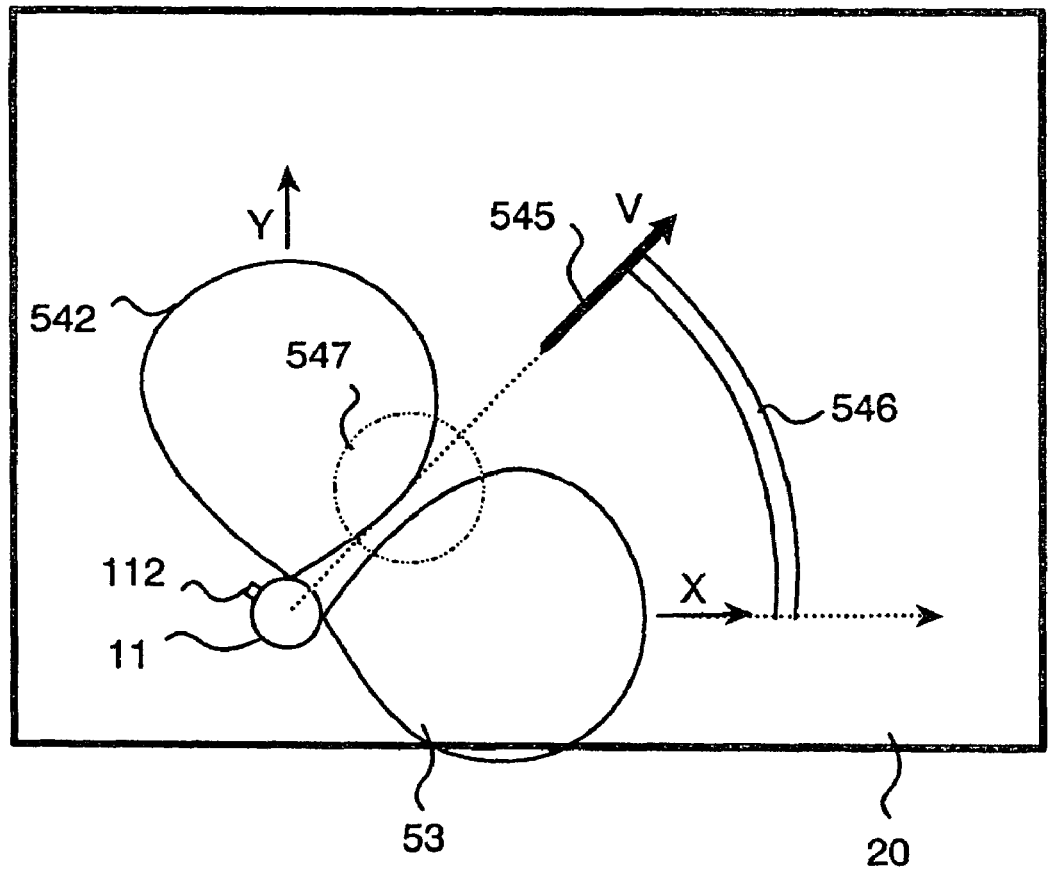
FIG. 12 Method of measurement of displacement in a horizontal plane using ultrasonic beams in the pen.

The operation of the system is further detailed with reference to FIG. 12, which illustrates a top view of the writing pad 20 with the pen-shaped device 11 thereon.

Preferably pen 11 also includes an orientation indicator 112, to allow its rotation to bring the pen into the correct orientation, wherein the ultrasonic beam 542 points in the y-axis direction, and ultrasonic beam 53 points in the x-axis direction. An arrow may be printed on the pen, for example.

As each US beam is used to measure the velocity in its direction, the total velocity vector V (545) and its orientation Q (546) are computed.

Throughout the present disclosure, unless explicitly stated otherwise, a description relating to velocity computation also applies to phase computation (and the displacement which is proportional to that phase), and vice-versa.

Although the beams 53 and 542 are orthogonal to each other and there is little, if any, coupling between them in the air, it has been found by the present inventors that there is a significant measure of undesired coupling between the X and Y axes.

After an extensive investigation and research, it has been found that the coupling happens through the writing surface 20—there is an area of overlap 547 on pad 20, which causes pen movement along one axis to also affect the measurement along the other axis.

Accordingly, electronic separation means have been devised to eliminate the undesired coupling between the X and Y axes through pad 20.

In one embodiment of the electronic separation means, each of the beams 53 and 542 is transmitted at a different frequency, with filtering means in the receiver. Thus, only received signals resulting from the transmission at the designated frequency for that axis will be processed in that receiver. See also, for example, FIG. 15 and the related description. This allows concurrent operation of displacement measurement in both axes.

In another embodiment of the electronic separation means, each of the beams 53 and 542 is transmitted alternately, and reception for each axis is only allowed during these time periods. See for example, FIG. 14 and the related description.

This structure may achieve a lower cost implementation, with a common receive channel and operation at a single frequency; however, measurements in each direction are only performed part of the time. The multiplexing rate is limited by the transducer bandwidth.

Figure 13:
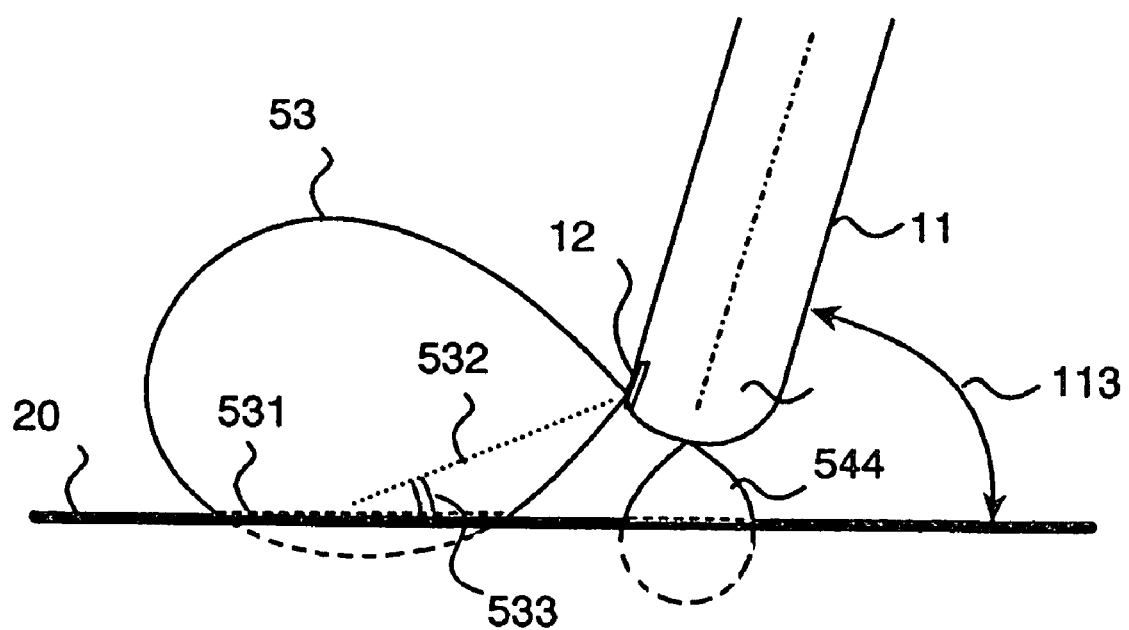
FIG. 13 Method of measurement of horizontal and vertical displacement using ultrasonic beams in the pen.

FIG. 13 details the measurement of horizontal and vertical displacement using ultrasonic beams in the pen 11, for the embodiment of FIG. 11. It details a vertical plane view the pen 11 and pad 20.

The US transmitter/receiver 12 generates a US waves pattern 53, to transmit US waves which illuminate an area 531 on writing pad 20 with US waves. Part of these US waves are reflected off the area 531 and are received back at transducer 12.

There is an average vertical angle 533, thus the sensor does not measure the actual horizontal velocity but its component in the measurement direction 532. The velocity readout can be corrected based on the angle 533. A vertical beam 544 may be used for pen's height measurement. The pen's angle of inclination 113 may be used as well.

FIG. 14 details a block diagram of digitizing pen system with transmitter and receiver integrated in the pen 11. It uses a transmitter 331 for generating an electrical signal at the required US frequency.

The signal is transferred to one of the transducers 12 or 13, through an electronic switch 332.

As switch 332 alternately points to transducer 12 or 13, a beam of US waves is alternately transmitted in the x-axis or y-axis direction, respectively. Transmit/receive means 335 separates the transmit signals sent to transducer 12 from the receive signals generated in transducer 12 by US waves received therein. This allows the same transducer 12 to be used simultaneously, both as a transmitter and as a receiver. A bridge circuit may be used to that purpose, for example.

In another implementation, separate transducers may be used, one as transmitter (fixedly connected to the upper right side of SW1 332), a second transducer as a receiver (fixedly connected to the upper right side of SW2 333).

Similarly, transmit/receive means 336 separates the transmit and receive signals for transducer 13, when using one transducer as both transmitter and receiver.

The received signals are multiplexed using an electronic switch 333, which alternately couples echo signals for the x-axis or the y-axis to a receiver 337.

A controller and timing means 334 controls, among others, the concurrent operation of the switches 332 and 333, so as to activate both transmission and reception in the same direction, at the same time.

The timing of the controller may also be synchronized with the transmit signals generated in the transmitter 331.

A computer means 338 measures the phase difference between signals received in transducers 12 and 13, and a reference signal from transmitter 331.

The displacement in each axis (x,y) is computed accordingly.

The new device can be used to directly replace the mouse now in use, with no changes in the PC computer or its interface—see for example the disclosure relating to FIG. 6.

The above discussion refers to a preferred embodiment which uses a common transducer both as transmitter and receiver. Throughout the present disclosure, where such a structure is detailed, it is to be understood that there is another preferred embodiment, using separate transducers, one for transmission and the other for reception. In this case, the transmit/receive means 335 or 336 are not necessary.

Thus, FIG. 14 implements a time multiplexing device, with time multiplexing used as the means of electronic separation between the x-axis and the y-axis.

The multiplexing speed may be limited by the bandwidth limitations of the transducers. The system measures displacement in each direction only part of the time.

In a three dimensional implementation, time multiplexing may be implemented between the x-, y- and z axes.

The structure of either FIG. 14 or 15 may also be used, for example, for the third embodiment of the invention, as illustrated in FIG. 19A.

FIG. 15 details a block diagram of another embodiment of a digitizing pen system with transmitter and receiver integrated in the pen and using frequency multiplexing as means of electronic separation between the x-axis and the y-axis.

This structures uses separate transmitters 341, 342, for generating each an electrical signal at a required US frequency F1 and F2, respectively. The signal from transmitter 341 is transferred to transducer 12 through transmit/receive means 343. Similarly, the signal from transmitter 342 is transferred to transducer 13 through transmit/receive means 344.

Using frequency separation, the pen 11 using this structure can concurrently measure both x-axis and y-axis displacement, all the time, using CW signals. The controller and timing means 334 controls, among others, the operation of the phase detectors in computer means 338, and may be synchronized with the signals generated in transmitters 341, 342.

The computer means 338 measures the phase difference between signals received in transducers 12 and 13, and reference signals from transmitters 341, 342 received through controller 348.

The displacement in each axis (x,y) is computed accordingly.

The new device can be used to directly replace the mouse now in use, with no changes in the PC or its interface—the computer means 338 can send the displacement information over channel 339, in the format now used for the PC mouse, as detailed, for example, with reference to FIG. 6.

Figure 16A:
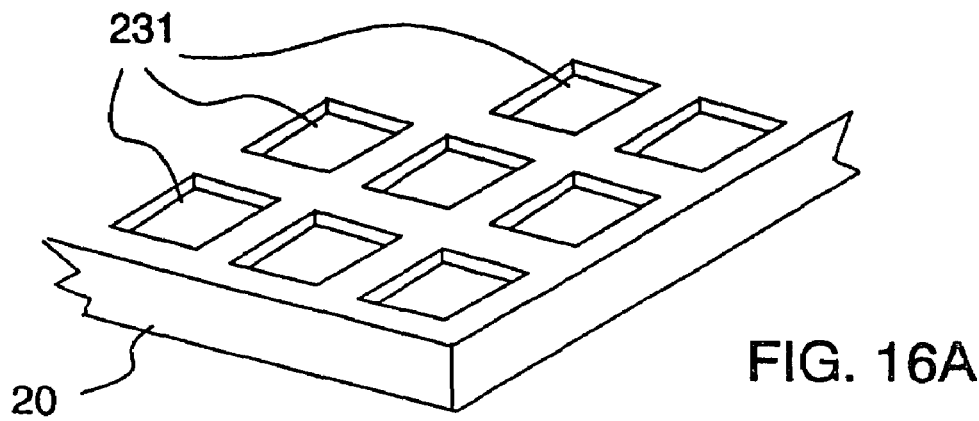
FIGS. 16A, 16B, 16C Structure of a rough, waves reflecting writing surface.
Figure 16B:
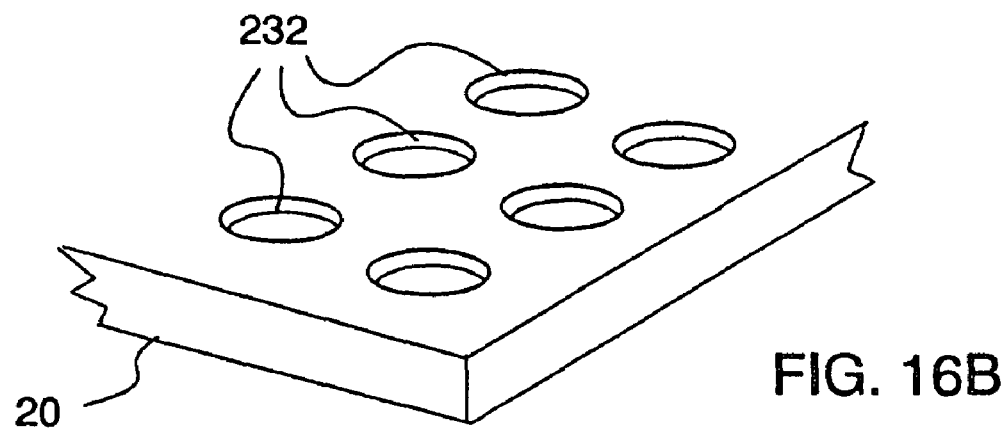
Figure 16C:
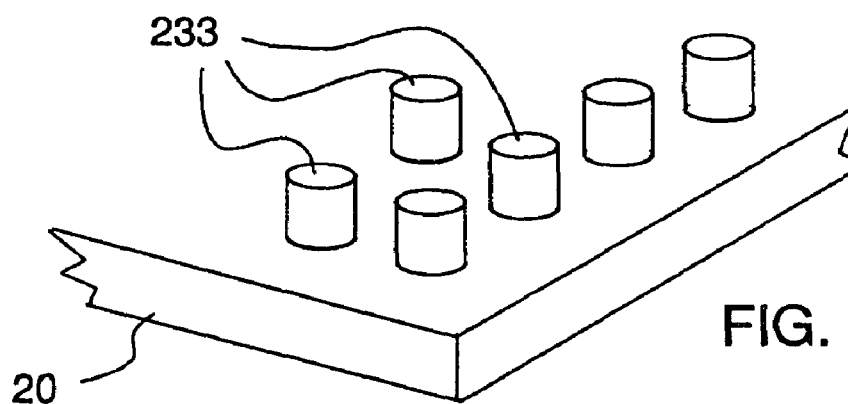

FIGS. 16A, 16B, 16C detail examples of a writing surface including US waves reflection means, implemented here as a measure of roughness in the surface 20.

Preferably the surface 20 should have a measure of roughness, to better reflect US waves back, towards a receiver in the pen, in the mode of operation as illustrated in FIG. 11 or 13. In one embodiment, a random roughness pattern may be used. FIGS. 16A, 16B and 16C illustrate various shapes of an orderly surface roughness, in the form of a mesh of square depressions, a pattern of holes and a pattern of cylindrical protuberances, respectively.

Asperities on the surface may include a mesh 16A, a pattern of holes 16B or of protuberances 16C, or a random pattern, for example.

Preferably, each of these elements should have dimensions of 5% of the wavelength or more, to achieve a strong US waves back reflection.

Various other shapes may be advantageously used.

Figure 17:
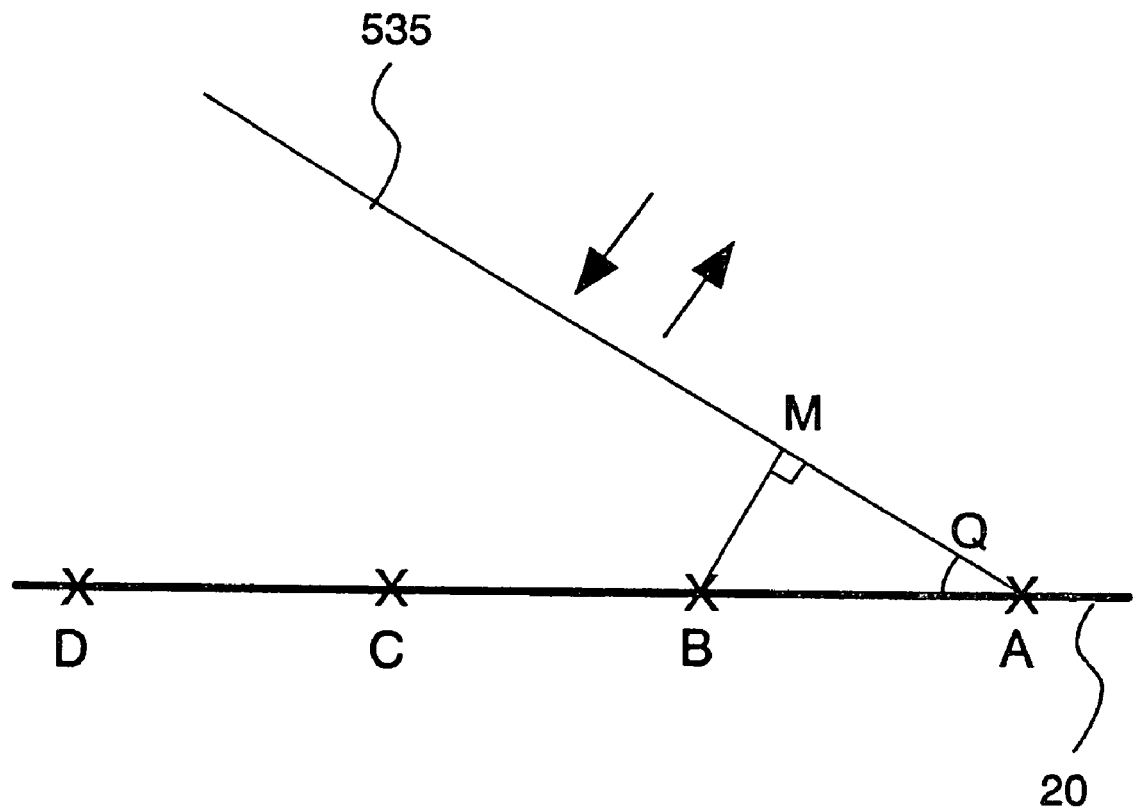
FIG. 17 Dimensions of a roughness pattern, for achieving a specific angle of reflected waves Q.

FIG. 17 illustrates preferred dimensions of a roughness pattern, to achieve a specific angle of reflected waves Q, for a US wave front 535. The segment AM is part of the US wavefront. In one embodiment, the angle Q may coincide with the angle 532 of FIG. 13.

The maximum reflection is in the direction where all the reflections from points A, B, C, D, etc. add in phase. The angle Q is defined by the distance AB between reflecting points and wavelength, as known in the art.

Figure 18:
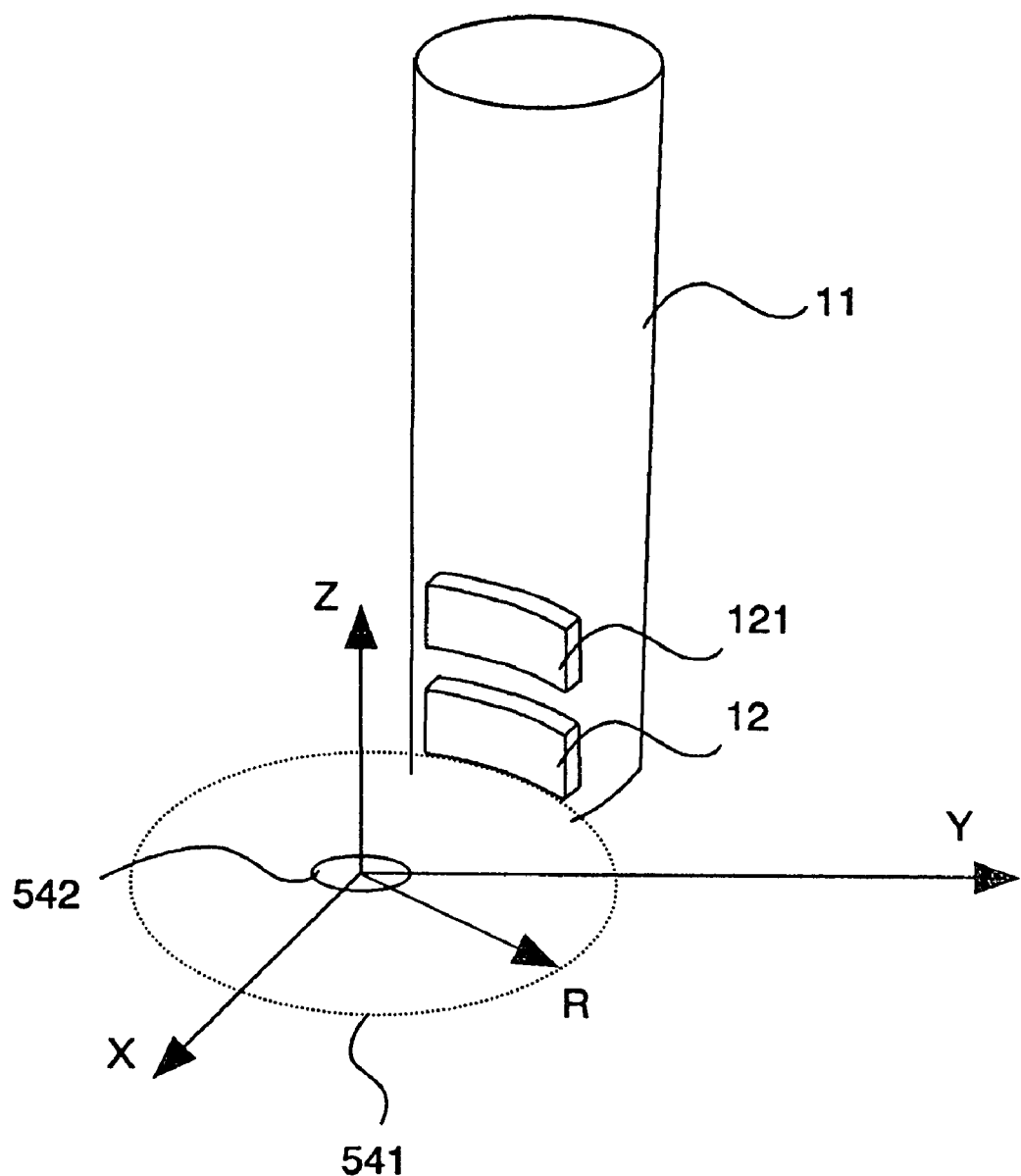
FIG. 18 Structure of an aperture of the transmit/receive transducer, for achieving a focused beam in the near field.

FIG. 18 details a preferred embodiment for the aperture of a transmit/receive transducer, with means for achieving better control over US waves reflected off surface 20 back towards the pen 11. These means are implemented as a focused beam on the reflecting surface 20, in the near field of the transducers 12 and 121.

Such a structure is advantageous for the second embodiment (see FIG. 11). The structure may be less desirable for the embodiments of FIG. 4 or 19A, where other shapes of US beam patterns are preferred, as detailed there.

Transducer 12 has a concave, circular arc shape, corresponding to a circle of radius R in the x-y plane, as illustrated.

The transducer may be made of a piezoelectric material with electrodes mounted so as to achieve a radial expansion/compression cycle.

Thus, US waves are transmitted in phase from the whole of the surface of transducer 12, with the waves adding coherently at the center of the circle 451, that is the origin of the coordinates.

In a practical implementation, there is a small area 542 near the origin, where most of the US energy is focused. Since US waves add in phase along the z axis, raising the pen 11 still will retain US waves focused in a small area 542.

When using one transducer 12 as transmitter/receiver, the focused array pattern is advantageously present both in transmit and receive. Alternately, two identical transducers 12, 121 can be used, as illustrated, one as transmitter and the other as receiver.

The transducer may be made of a piezoelectric material as known in the art, such as ceramics or plastics. Matching layers may be used as necessary. Small transducer elements may be used in a focused array structure, being located so as to form the circle arc or radius R, as illustrated.

Alternately, other types of transducers may be used, with US lenses devised to achieve the abovedetailed US transmit/receive patterns.

FIG. 19A illustrates a third embodiment (E3) of a digitizing pen system, with dual US waves reflecting means at the sides of the writing surface. In one embodiment, these means comprise a pair of lateral waves reflecting surfaces 241, 242 at the edges of the writing surface.

The lateral reflecting surfaces may be placed on any smooth surface such as a tabletop. The US transmitter in the pen is reflected in each vertical surface, like an image in a mirror. The receiver in the pen will receive US waves appearing to emanate from the image beyond each vertical wall.

A pointing pen 11 has near its tip a transducer 12, used as a transmitter of US waves 545 directed generally towards surface 241, with another transmitter of US waves 546 directed generally towards surface 242.

The smooth surfaces 241, 242 generally act as mirrors for the ultrasonic waves, with the strongest reflected US wave being normal to the plane of each of the above surfaces.

The operation of the device is further detailed with reference to FIGS. 20 and 21.

Two lateral surfaces 241, 242 are preferably located at the upper and left edges of the writing surface, as illustrated. A writing pad 20 is optional; if used, then surfaces 241, 242 can be attached at its edges. If no pad 20 is used, the structure formed by the two smooth surfaces 241, 242 can be placed on a table top or another smooth surface, thereby forming a writing surface for using the pointing pen 11.

The two surfaces 241, 242 may be made of a suitable plastic, that can be manufactured with a smooth planar surface and has a generally rigid characteristic, to preserve it shape and the angle between the two surfaces. Other materials can be used as well, such as wood, glass, metal, a combination of the above, etc.

The upper and left-edged reflecting shape is suitable for right-handed persons; for left handed persons, the preferred structure comprises an upper and right-edged reflector. The same device can be put on the table in a rotated orientation, to that purpose.

Figure 19B:
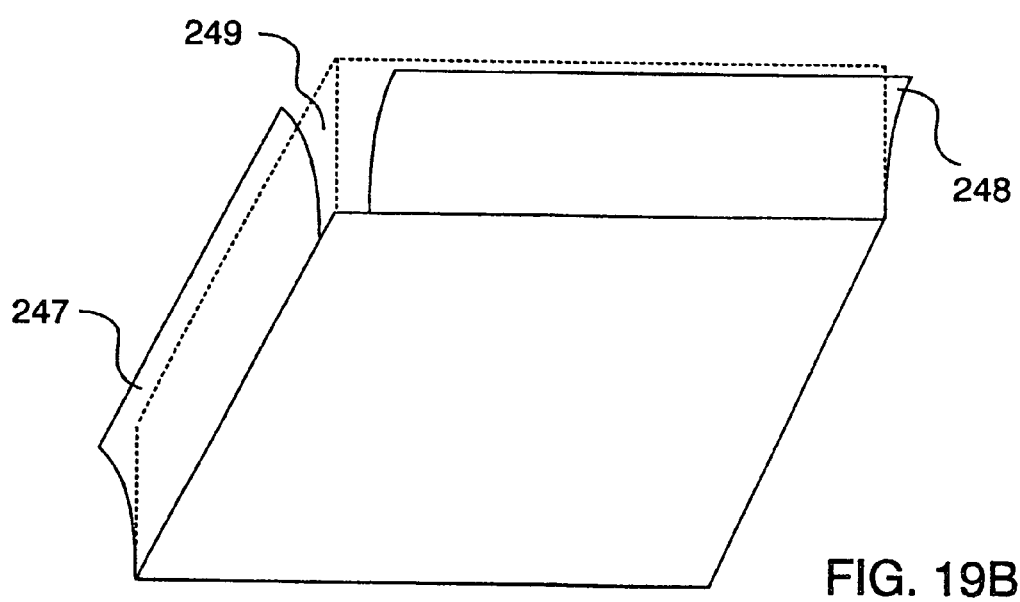

FIG. 19B details means for attenuating the standing waves effect due to multiple reflections between the lateral surfaces and the body formed by pen with user's hand.

In one embodiment of these means, convex reflecting surfaces 247, 248 are used in lieu of the planar surfaces 241, 242 respectively. The curved surfaces act as US waves dispersing means Furthermore, means for attenuating the "corner reflector" effect are included, implemented here with the removal 249 of the reflecting surfaces near the vertical corner therebetween.

Figure 20:
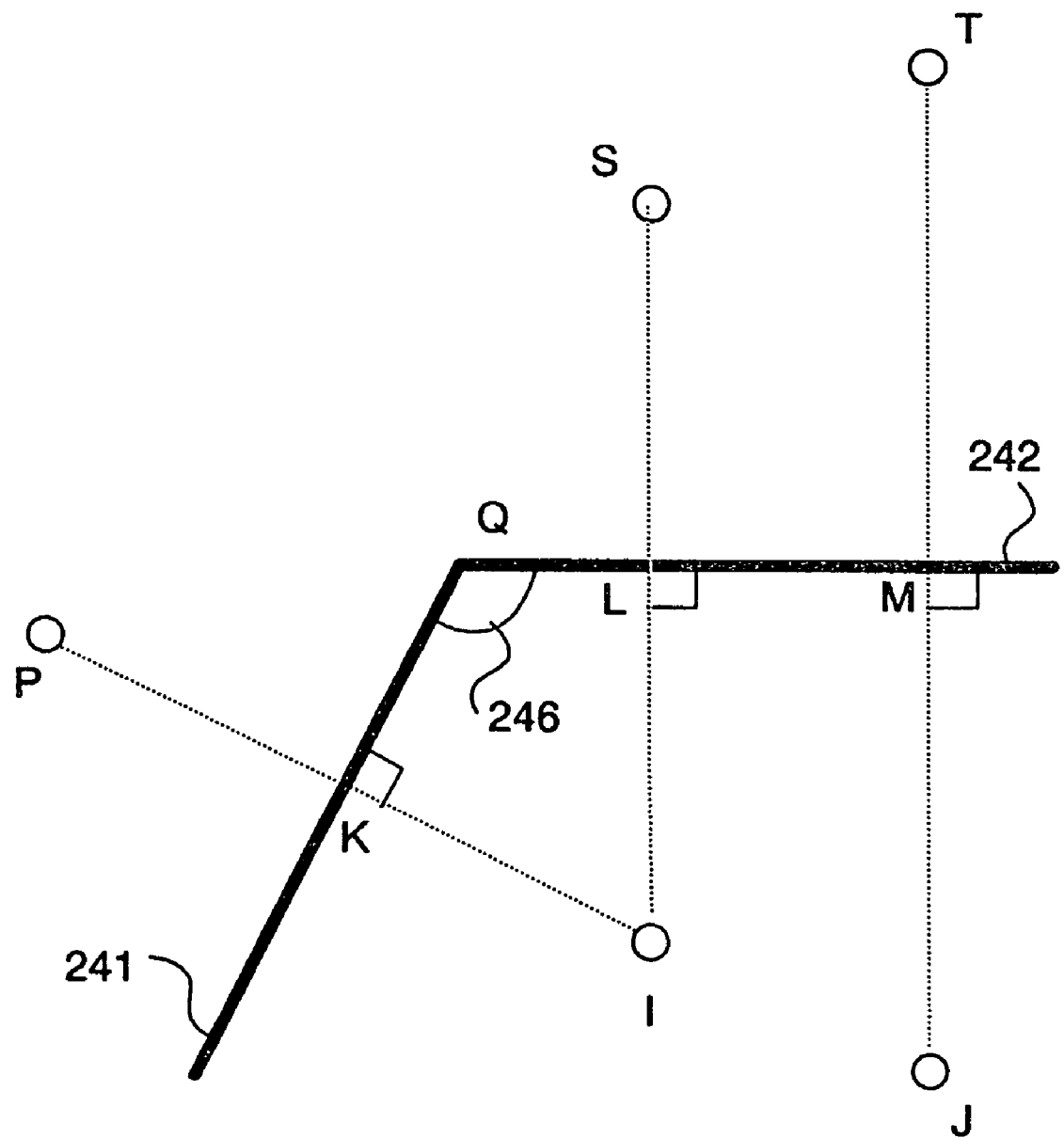
FIG. 20 Method of operation, using lateral reflecting surfaces.

FIG. 20 illustrates the method of operation in this embodiment. Let us assume the pointing pen 11 is located at point I—then the surface 241 acts as a mirror for US waves transmitted in its direction, thus the US receiver in the pen will see an image of the US transmitter at location P. The line of sight IP is normal to surface 241, with the range to the image KP being equal to the range KI to the pen.

Similarly, US waves transmitted from point I towards the surface 242, which also acts as a mirror, will create an image of the US transmitter at location S. Again, line of sight IS is normal to surface 242, with segment IL being equal to segment LS.

As the pen moves from location I to location J, for example, its image on surface 242 moves from point S to point T.

Thus, the US receiver in the direction of surface 242 will measure changes in the distance to that surface (actually twice the value of the displacement towards or away from surface 242). The displacement is illustrated, in this example, with the difference between the lines IL and JM. Precise displacement measurement can be performed using the measured phase of the reflected signal. The phase is proportional to displacement.

The smooth surfaces 241, 242 generally act as mirrors for the ultrasonic waves, with the strongest reflected US wave being normal to the plane of each surface. In a preferred embodiment, "Smooth surface" means that the side of parts 241, 242 which is in the direction of the pen (towards points I, J) has a planar surface and asperities, if any, are very small relative to the US waves wavelength.

If the angle Q (246) is normal (90 degrees) then the displacement thus measured with respect to surface 241 is the x-axis displacement, and the displacement with respect to surface 242 equals the y-axis displacement, in the desired orthogonal (x,y) plane.

If the angle Q has a different value, then a simple coordinate transformation can be computed, based on the fixed angles of the images on the above surfaces. For example, if surface 242 is parallel to the x axis, then displacement towards that surface equals the y-axis displacement. The x-axis displacement can be computed from the displacement relative to the surface 241, using vector calculus with simple geometry.

A pen structure similar to that illustrated in FIG. 11 can be used, however in this embodiment (E3) there is no need for a surface 20 with a means for waves back reflection (as is required in Embodiment E2, using a measure of roughness for example). Rather, a smooth writing surface can be used, such as a regular table top.

The displacement may be measured using phase measuring means, as detailed with reference to FIGS. 14 and 15, for example.

If so desired, the absolute location of pen 11 can be measured in real time, using a structure as detailed in FIG. 14 or FIG. 15, with a modulated signal at transmitter 331 or 341—FM modulation for example.

In this embodiment (E3), the pen's location is not necessary for computing the pen 11 displacement.

Figure 21:
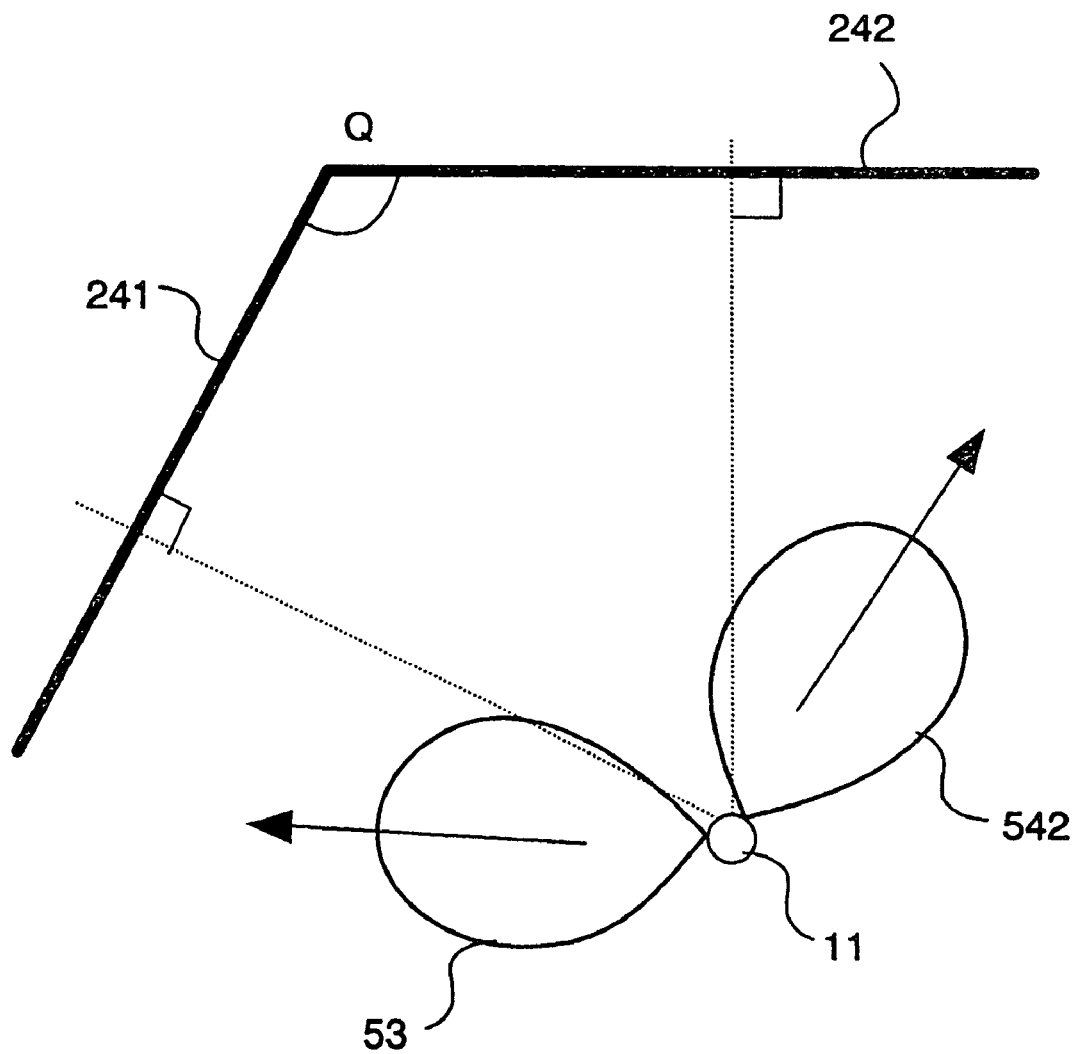
FIG. 21 Means for attenuating undesired coupling between axes, using a directional pattern of ultrasonic transducers.

FIG. 21 details means for attenuating undesired coupling between the reference axes (x,y).

The problem: The pen-shaped device 11 uses US waves patterns 53, 542 generally directed towards surfaces 241, 242 respectively. An undesired "corner reflector" effect may occur, wherein US waves transmitted through beam 53, for example, traveling diagonally towards surface 241 (in a left-upwards direction), will be reflected towards surface 242 and from there—back to the beam 53. This undesired reflection has a phase that depends on both the distances to surfaces 241, 242.

The receiver for beam 53 will receive the sum of the desired return (normal to surface 241) and the undesired return (after reflections in both surfaces 241 and 242). The resulting signal may have an erroneous value, that may result in disturbances in the measurement of displacement towards surface 241. The same problem may occur with beam 542.

Accordingly, the present disclosure includes means for attenuating or eliminating the "corner reflector" effect. Following is a description of several embodiments of means for eliminating the corner effect. These means may be used separately or in a combination thereof, to achieve the desired effect. Examples of possible embodiments of these means:

CR1. Using an obtuse angle Q(246) between surfaces 241 and 242. Thus, an US signal undergoing a double reflection will usually be reflected away from the pen 11. That is, the angle Q(246) is larger than 90 deg.

CR2. Using curved surfaces 247, 247 (see FIG. 19B) rather than planar reflecting surfaces such as 241, 242. Each surface further attenuates the US waves, thus undesired waves undergoing a double reflection will have a smaller power than the desired ones which undergo just one reflection.

CR3. Elimination, or removal 249 of the reflecting surfaces near the vertical corner therebetween.

CR4. Using surfaces 241, 242 that are not vertical but at an angle 243 smaller than 90 deg., see FIG. 9. Multiple reflections are directed upwards.

CR5. Using US beams 53, 542 each directed away from the other surface (from the normal to surfaces 242, 241 respectively), as illustrated by way of example in FIG. 21. In this structure, each beam strongly attenuates in the direction of the other surface.

CR6. Using electronic means in the receiver 337, 345, 346 (FIGS. 14, 15) to suppress the weaker (undesired) signal at that receiver's input.

Such means may include phase lock loop (PLL) means, a comparator, a hard limiter or a combination thereof, for example.

A general structure of pen 11, with US transmitters/receivers as illustrated in FIG. 11 can be used, with modifications as detailed above.

FIG. 22 details one embodiment for a zero force button installed on the pen 11. The button can be used to implement the activation buttons 15, 151 on pen 11, see FIG. 11. It can be used to replace the Left and Right pushbuttons in the computer mouse. Either one, two or more buttons may be used with the pen 11. Following is detailed one embodiment of a zero force button.

The opening 351 can be a hole in the casing of pen-shaped device 11, or a transparent or translucent window.

A photodetector means 352 senses the level of ambient light reaching it. When the opening 351 is unobstructed, a measure of ambient light will reach the detector 352, resulting in a certain electrical current/voltage. This current or voltage is measured in electronic means 353 (a comparator, for example), to generate a digital signal output 354, indicative of the state of the button: Either activated or not.

When the user places his/her finger over the opening 351, the amount of ambient light reaching detector 352 is drastically reduced, maybe to a close to zero level. Accordingly, this change is detected by comparator 353 and affects the output 354. Thus, a digital output 354 is generated responsive to a user's finger movement, without moving parts in the pen and without requiring a force to be exerted upon the pen.

Other zero force sensor means may be used as well, for example using an infrared sensor (either near or far IR), an electrical contact sensor, AC induced voltage sensor, etc.

The button's output signal 354 may be connected to the controller 45 (FIG. 6) or the computer means 338 (FIG. 14 or 14), to be transferred to the PC as mouse pushbutton activating signals, for example.

FIG. 23 illustrates a method for height processing in the pen, using a phase difference measurement as detailed elsewhere in the present disclosure.

There is the actual height 551 versus time 510, for an illustrative example. This may result in a measured phase difference 552, taking into account the 360 degrees overflow, see also FIG. 1.

The reconstructed height 553, after correcting for 0-360 degrees overflow. The correction is performed by adding or subtracting 360 to the phase reading, to create the virtual phase 528 as detailed in FIG. 1.

The variations in pen's height as a function of time can be measured at a fast rate, with great precision, by measuring the phase of US waves reflected off the writing surface. See for example beam 544 in FIGS. 11, 13, etc. The operation of the phase difference detector has been detailed above.

Figure 24:
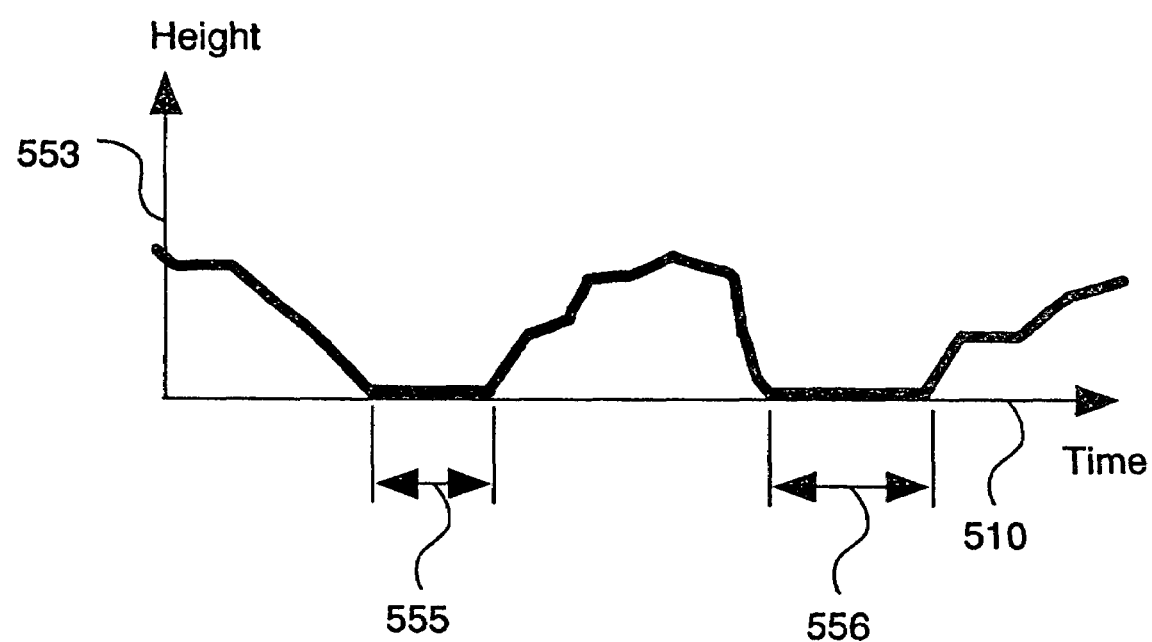
FIG. 24 Method for measuring the absolute pen's height.

Because of the phase ambiguity and other factors, the absolute height is not known. There are applications where only variations in height are required, rather than the absolute height.

Where absolute height is required, FIG. 24 details a method for measuring the absolute height using pen's collisions with the writing surface 20.

HR1. Absolute Height Reconstruction Method
1. The computer tracks the reconstructed height 553 versus time 510. During pen's use for drawing or writing for example, the pen will occasionally bump into the writing surface, wherein the vertical displacement is zero, for example during time periods 555, 556.
2. The computer can detect these periods 555, 556 based on their unique characteristics in terms of velocity and acceleration. It is understood that the absolute height is zero during these time intervals.
3. The whole graph of the height vs. time is clamped to zero at these time intervals. The rest of the graph then gives the actual absolute height as a function of time.

In another embodiment, the transmit waveform is modulated as detailed above, using FM for example. The modulation of the reflected wave can be used to compute the absolute height.

Having solved the problem of measuring the pen's height in real time, the next problem is how to make use of this novel information.

Several possible methods are presented, as illustrative examples of embodiments of the present invention:

MH1. Height replaces the activation button: a threshold is defined, and the; actual measured height is compared thereto. When the pen is below the threshold, it is interpreted as a "pushed button" state. An electrical signal is sent to a software application that may be activated with the button. When the pen is above the threshold, it is interpreted as "button released" state, and a suitable signal is sent to the application.

This achieves an electronic pen which imitates the regular pen: When the pen is down (below threshold) the software may "write" or "draw" on the computer screen, at a location derived from pen's movements. When the pen is up, then no writing on screen will occur.

This allows for a simple, easy, natural man-machine (or woman-machine) interface: the user has just to move the pen over the writing surface and to slightly rise or lower it, and the computer promptly responds to write on screen as desired by the user.

MH2. Height Replaces two Activation Buttons, to Define a Three State Device:
1. Pen moving and writing—just as a regular pen. This state is active when the height is below a lower threshold TH1.
2. Cursor moving without writing—just as a regular pen, when the user desires to move it to another location on the work space. The user needs not look at the pen itself. Rather, he/she looks only at the screen all the time, moving the cursor to a desired location. This state is active when the height is between a lower threshold TH1 and a higher threshold TH2.
3. Pen inactive, not moving nor writing—like a regular pen being put down for a while.

This state is active when the height is above the higher threshold TH2.

MH3. Height is interpreted as a third dimension, for example to control the instantaneous width of a line drawn on screen. Calligraphic handwriting can thus be achieved.

In tri-dimensional applications, for example 3D drawing, CAD or CAE, the pen-shaped device can be used to directly point in a tri-dimensional space.

A real-time, 3D man-machine interface may thus be achieved, with superior performance due to sensing a pen's movements—the pen has the unique advantage, that users can move a pen precisely as they desire.

MH4. Height is interpreted as a third dimension, and is entered into the computer using a sample/hold mechanism, for example using the buttons 15, 151 on the pen. For example, when the button 15 is activated, the height input to the application changes freely in real time, according to pen's instantaneous height; when the button 15 is released, the last height value is held fixed, so as to present a fixed height to the application.

The methods (MH3 and MH4) may be used in conjunction with methods MH1 or MH2, wherein the pen is either writing or not, and within the write enable range, the height is interpreted as a third dimension.

The pen can be activated with reverse thresholds (to write when it is raised up), although this appears a less preferred embodiment.

Possible values for the thresholds TH1 and TH2 may be about 2 mm and 5 mm respectively, for example.

A possible problem with the above methods is that it may be difficult for a user, despite his best intentions and efforts, to keep the pen at a precise, fixed height. Involuntary height variations are to be expected.

Figure 25:
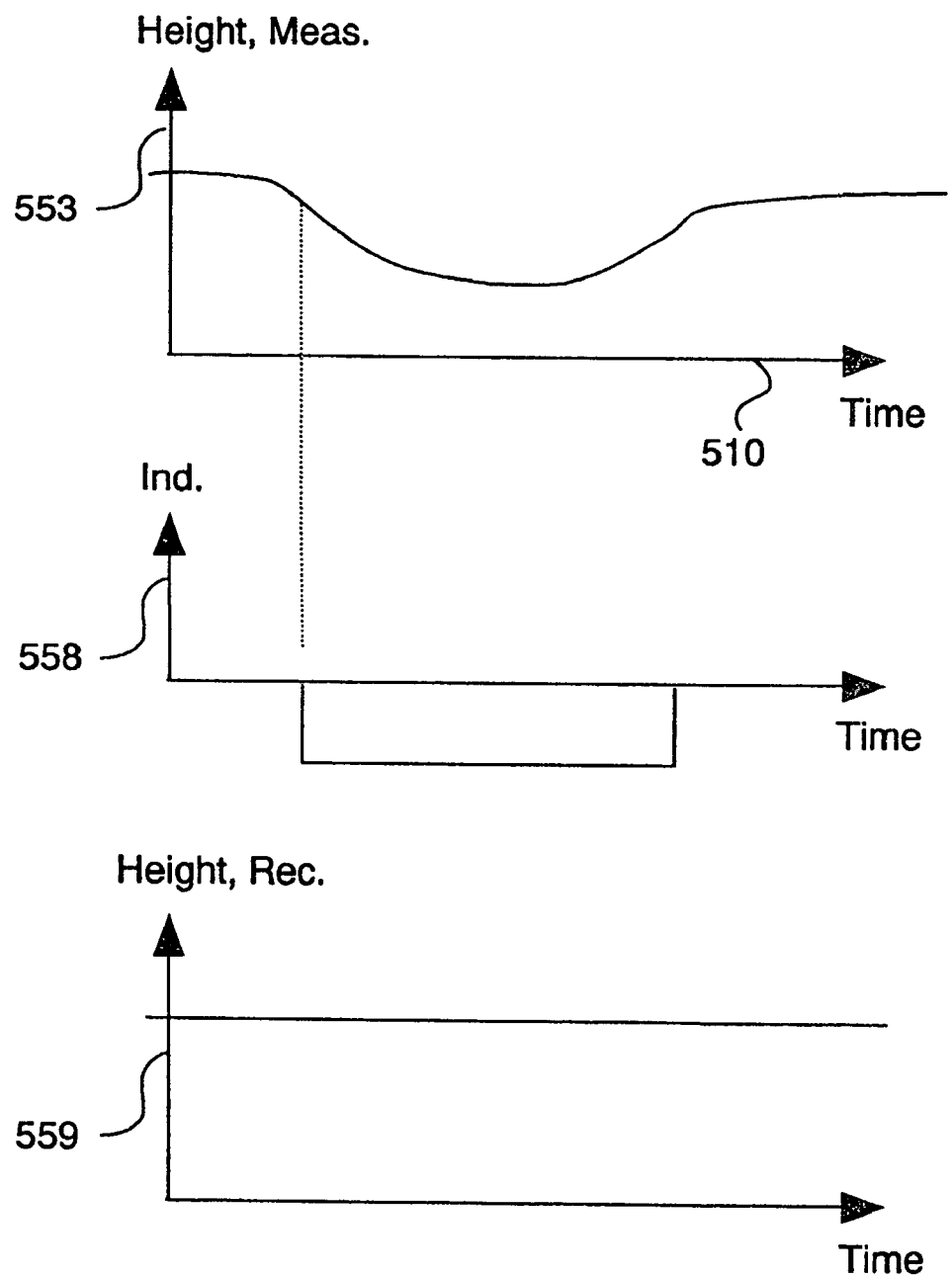
FIGS. 25 and 26 Method for interpreting a pen's height.
Figure 26:
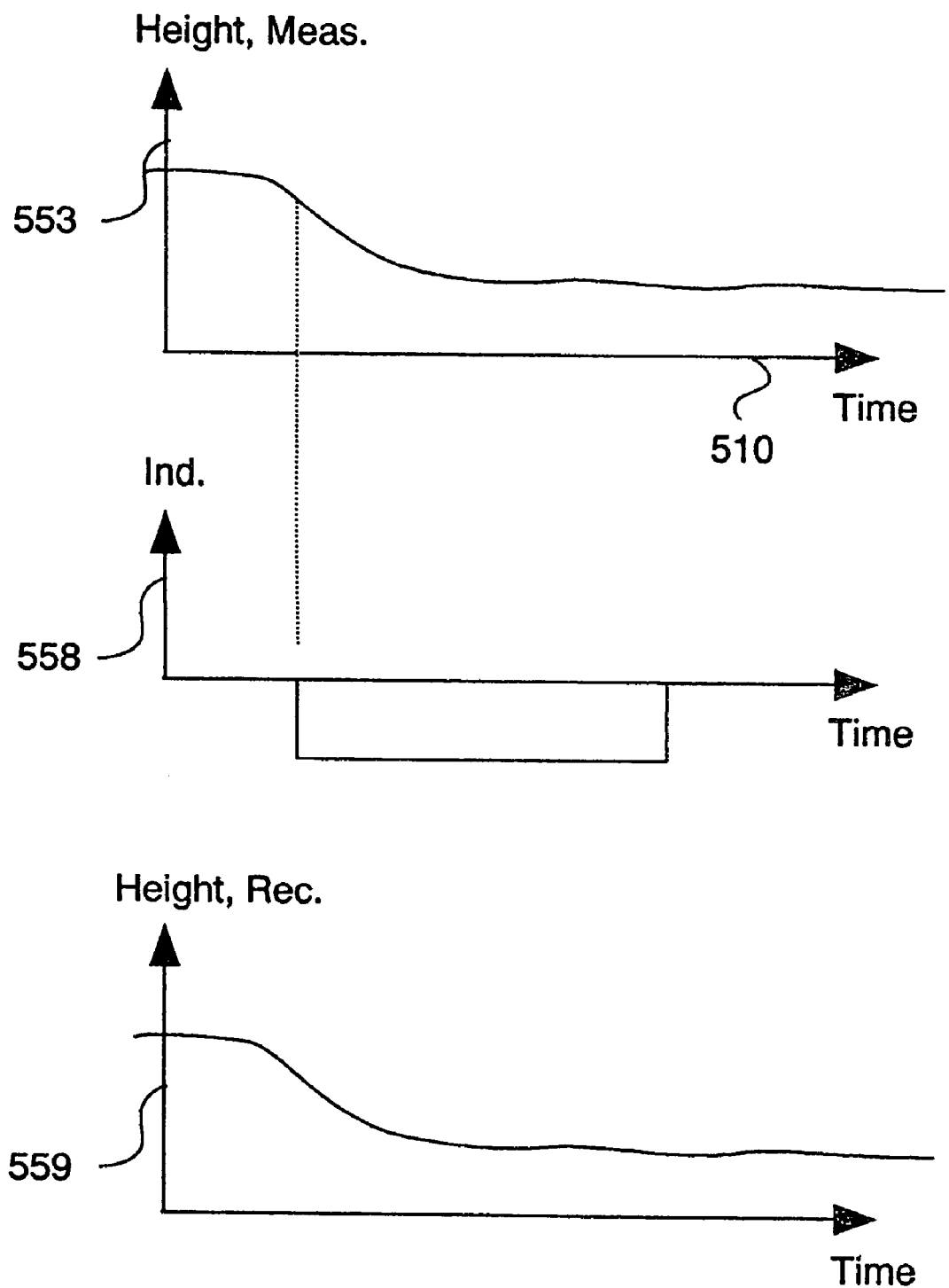

A possible solution is detailed in FIGS. 25 and 26, which illustrate a method for interpreting a pen's height as intended by the user. The method is based on measuring the feedback from the user, in real time.

As the computer tracks the measured height 553 as a function of time 510, an indication 558 is issued to user about the measured change in height.

Preferably, a positive/negative indication is issued, to indicate a positive/negative change in pen's height (negative in this example). The indication is preferably visual, such as a changing shape, a bar graph, the width of a line, a number, etc.

The computer then measures the user's response: If the user acts to correct the pen's height (to raise it back to about the former height, in the example as illustrated), then the whole episode is erased from memory, and the recorded height 559 (the height value to be used by the application) is considered constant, as illustrated in FIG. 25.

If, on the other hand, the user responds to the indication 558 by retaining the pen at the changed height responsive to the indication 558, as illustrated in FIG. 26—then this indicates to the computer an intentional change in the pen's height. In this case, the computer will record the whole episode of height variation in the recorded height 559.

The above method may be entirely automatic and intuitive from the user's point of view, to achieve a natural, free man-machine interface.

This is a method for interpreting a pen's intended height, based on measuring feedback from the user, in real time.

Figure 27:
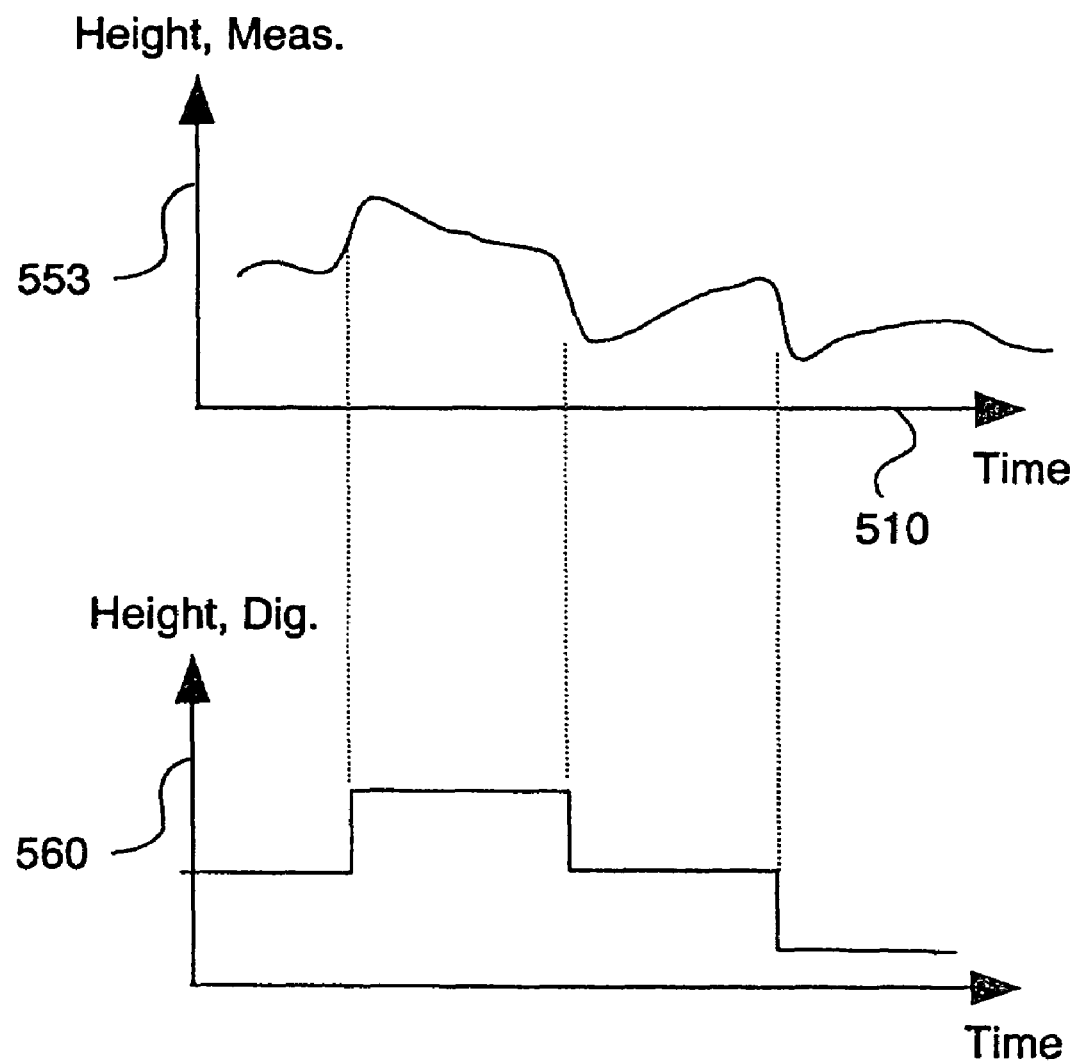
FIG. 27 Digitized/quantized height, responsive to vertical pen's velocity and/or acceleration.

FIG. 25—user returns pen to original height (approximately)—then height variation is erased from computer record of path FIG. 26—user retains height at the changed value, the all the height change is recorded "as is", as it happened in real time MH5. Changes in the recorded height are made responsive to fast pen up/down movements. An example of the method is illustrated in FIG. 27. responsive to a measured height 553 as a function of time 510, a digitized/quantized height 560 is computed, responsive to a pen's vertical acceleration. The user writes or draws while the computer keeps the recorded height (the height value used by the application or software) at a fixed value. When the user desires to change that height value, he makes an up or down fast pen movement, according to the desired change in height. These movements are different from the slow variations in height during normal writing or drawing, and are interpreted by the computer as such. The recorded height is thus changed by a predefined amount in the desired direction.

MH6. Button-activated changes in the recorded height, using a digitized/quantized height 560. The pen buttons 15 and 151 are used to change the height, one to add a predefined value to the height, the other to subtract that amount from the height.

The recorded height is kept fixed until the next button activation by the user.

Figure 28:
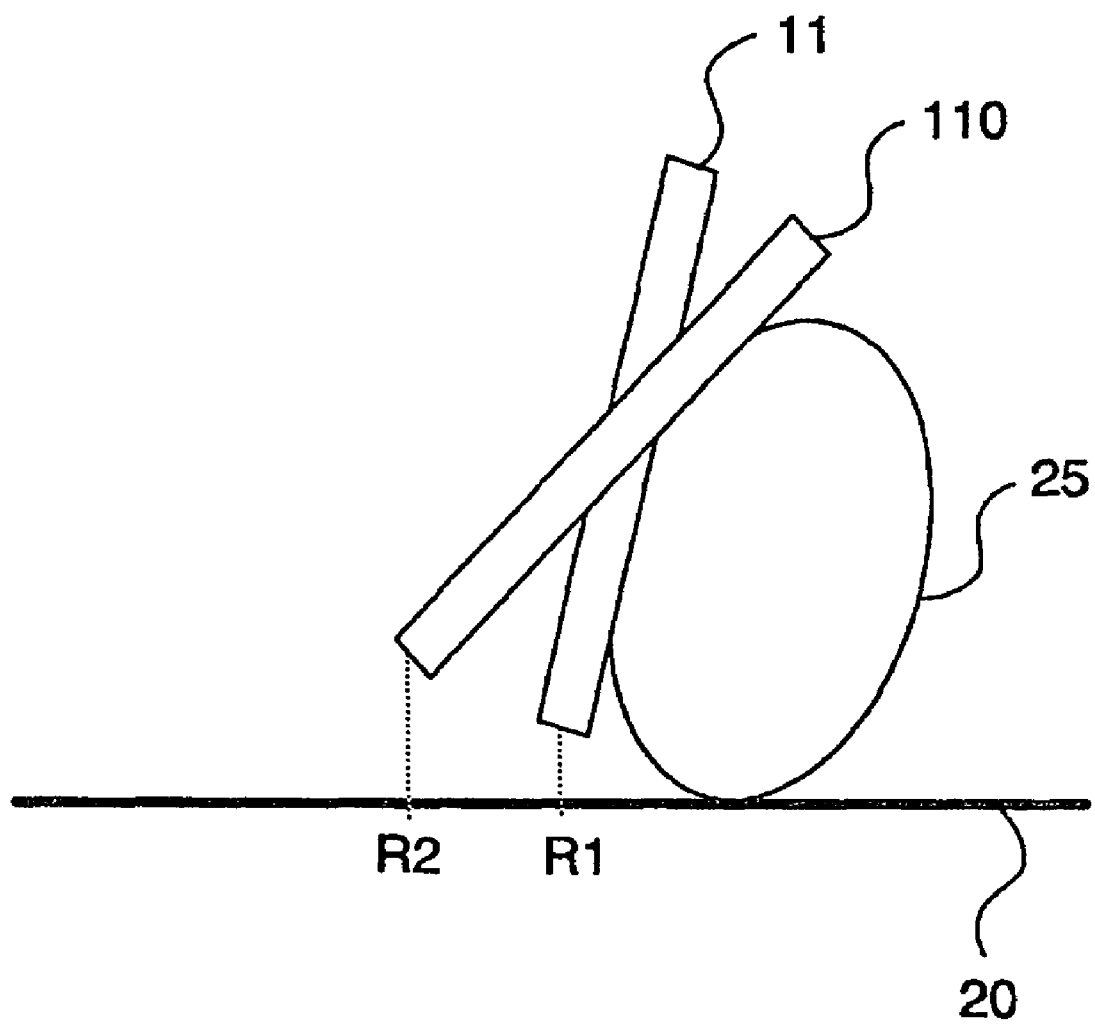
FIG. 28 Correction of unintentional horizontal displacements.

During tri-dimensional sensing of a pen's movement over a writing surface 20, there is a possible problem of an unintentional horizontal displacement caused by a change in the pen's height, as illustrated with FIG. 28—as the pen 11, held in a user's hand 25, is raised to the position indicated with 110, the horizontal location may change from R1 to R2.

This may be erroneously interpreted as a horizontal movement. For example, while the user points at an icon on screen and lowers the pen to activate that icon, the pointer may move to another icon and activate another app.

XYC1. Method for Correcting Horizontal Measurements Using Height

A possible problem is that vertical movements may cause undesired horizontal movements of the pen's tip. Accordingly, a method is disclosed for correcting these errors, as follows:

1. Keeping a correction table of x-axis and y-axis movements as a result of vertical (z-axis) movements. The table may be nonlinear, and may include a different rate of change for each axis, based on actual people's hands measurements. Alternately, a specific table may be computed for each user, based on measurements of his/her pen movements.
2. Measuring the pen's movements in three dimensions (x,y,z)
3. Correcting the x- and y-axis displacement according to the measured z-axis displacement (step 2) and based on the correction table (step 1).

Various other Embodiments of the Present Invention may be Implemented, for Example:

E4. Embodiment 4: Transmitter and receiver on pen; two point reflectors, such as corner reflectors, at two fixed locations, replace the reflecting surfaces of Embodiment 3. Not shown.

Fixed—like point reflectors for US waves back to pen, or—active reflectors; can vibrate, rotate, active (modulated).

Or—pen is repeater, can repeat US or IR, RF—only receives US

E5. Embodiment 5: similar to Embodiment 3, but the reflecting surfaces each vibrating at a fixed freq, different from that of the other surface—for example one at 100 Hz, the other at about 140 Hz, much as the membrane in a loudspeaker. Not shown.

Additional Features: Adds-on to the Above Embodiments
1. transmission: preferably CW or high duty cycle pulses (more than 20% tx); preferably at a fixed freq or alternating between two fixed frequencies
2. US transducers—transmit and receive: US transducers in air as known in the art, for example using ceramic or plastic piezoelectric means. At present operating at about 40 kHz. see for example Murata MA40 Series. Preferably at higher freq. in future—can achieve better resolution, etc.
3. Measuring the phase in (B2,J2), for measuring changes in the phase of the received signal:

Can use one transmit frequeny for the paths to both surfaces; vibrating reflecting surfaces, each vibrating at a different frequency FS1, FS2; the reflected wave from each is different: in one the displacement (Doppler) is superimposed on a subcarrier FS1, whereas in the other the displacement is on subcarrier FS2. The sinusoidal vibrations of the surfaces may create a plurality of harmonics in each direction, that may be described with the Bessel Functions. Frequency planning for the system, as well as the design of each receiver for optimal performance, may be performed as known in the art of Communications Engineering and Digital Signal Processing (DSP).

For example, in the receiver—filter means, selects either or separately FS1, FS2—then measure displacement in each direction accordingly.
4. In (B2, J2): measuring changes in the phase of the received signal—this is the phase difference between the received signal and the transmitted signal. Changes in the phase of the received signal are caused by pen's movement, according to the Doppler effect as known in the art. According to implementation, for example—a 360 deg. phase change may correspond to a one wavelength displacement.

corrects phase for overflow at the 0-360 deg. transition, to compute virtual phase with range +-INF., prior to displacement computation Possible Reference Implementations:

G1. use a reference signal, at the transmitted frequency. A sample of the transmit signal is transferred to the phase detector in the receiver, using either a wired or a wireless path. A wireless path may use, for example, IR or RF or a magnetic field, etc. Requires a link between transmitter and receiver, apart from the abovedetailed US waves path G2. use two separate sources, with means for preventing a frequency difference from disturbing the measurement. Does not require a link between transmitter and receiver, in additino to the US waves path. In one embodiment, two separate crystal oscillators are used, one in the transmitter, the other in the receiver. Each oscillator has a precise frequency and a low drift and low temperature coefficient. Thus, the freq difference is negligible.

In another embodiment, the receiver oscillator is made to track the transmitter, using for example a VCX0 in a PLL loop. the PLL may have a very slow time response (i.e. 15 sec or more) to measure pen's movements while tracking the average transmit frequency.

In yet another embodiment, two matched sources are used, that have been selected, for example, to have a close frequency and a similar temperature coefficient. If the two sources change in freq together, no problem.

The novel technology input device may advantageously be used in various applications, including for example: a replacement for the computer mouse, digitizers, tri-dimensional input devices, tri-dimensional digitizer, electronic presentation boards, user identification systems using handwriting characteristics, keyboard replacement system using a graphic input device and handwriting recognition software, etc.

It will be recognized that the foregoing is but one example of an apparatus and method within the scope of the present invention and that various modifications will occur to those skilled in the art upon reading the disclosure set forth hereinbefore.

What is claimed is:

1. A graphic input device for measuring a displacement of a pen-shaped pointing device, comprising:
   A. the pen-shaped pointing device moving about a writing surface and transmitting ultrasonic (US) continuous waves (CW) propagating in the air;
   B. two receivers close to the writing surface, each including means for receiving US waves from the pen-shaped pointing device and for measuring a phase of the received waves, wherein a change in the phase is proportional to the displacement of the pointing device relative to that receiver;
   C. means for a coarse measurement of a pen-shaped pointing device's location with respect to the two receivers;
   D. means for computing a displacement in fixed orthogonal (x-y) coordinates from the measured displacement relative to the two receivers and the measured coarse pen-shaped pointing device location.

2. The graphic input device according to claim 1, further including means for correcting for overflow at each 0-360 deg. transition in the phase.

3. The graphic input device according to claim 1, wherein the pointing device has a waves transmit pattern that is wide in a horizontal plane and narrower in a vertical plane.

4. The graphic input device according to claim 1, wherein each receiver has a waves receive pattern that is wide in a horizontal plane and narrower in a vertical plane.

5. The graphic input device according to claim 1, further including means for transmitting data indicative of the two measured phase values and the coarse pen-shaped pointing device location to a computer, for computing a displacement in fixed, orthogonal coordinates in the computer.

6. The graphic input device according to claim 1, wherein the means for a coarse measurement of the pen-shaped pointing device location include transmitter means having a transmit frequency alternating between two fixed values, and receiver means for measuring the distance in each of the two directions from changes in the received phase responsive to each frequency change.

7. The graphic input device according to claim 1, wherein the two displacement values are measured at a higher rate than that of measuring the coarse pen-shaped pointing device location.

8. The graphic input device according to claim 1, further including means for measuring a pen-shaped pointing device's displacement normal to the writing surface by measuring a phase of US waves reflected off that surface.

9. A graphic input device for measuring a displacement of a pen-shaped pointing device, comprising:
   A. the pen-shaped pointing device moving about a planar writing surface and transmitting ultrasonic (US) continuous waves (CW) propagating in the air;
   B. a plurality of receivers close to the writing surface, each including means for receiving US waves from the pen-shaped pointing device and for measuring a phase of the received waves, wherein a change in the phase is proportional to the displacement of the pointing device relative to that receiver;
   C. means for a coarse measurement of a pen-shaped pointing device's location with respect to the each of the receivers;
   D. means for computing a displacement in fixed orthogonal (x-y) coordinates from the measured displacement relative to the receivers and the measured coarse pen-shaped pointing device location.

10. The graphic input device according to claim 9, wherein the pointing device has a waves transmit pattern that is wide in a horizontal plane and narrower in a vertical plane.

11. The graphic input device according to claim 9, wherein each receiver has a waves receive pattern that is wide in a horizontal plane and narrower in a vertical plane.

12. The graphic input device according to claim 9, further including means for transmitting data indicative of the two measured phase values and the coarse pen-shaped pointing device location to a computer, for computing a displacement in fixed, orthogonal coordinates in the computer.

13. The graphic input device according to claim 9, wherein the means for a coarse measurement of the pen-shaped pointing device location include transmitter means having a transmit frequency alternating between two fixed values, and receiver means for measuring the distance in each of the two directions from changes in the received phase responsive to each frequency change.

14. The graphic input device according to claim 9, wherein the two displacement values are measured at a higher rate than that of measuring the coarse pen-shaped pointing device location.

15. The graphic input device according to claim 9, further including means for measuring a pen-shaped pointing device's displacement normal to the writing surface by measuring a phase of US waves reflected off that surface.

16. The graphic input device according to claim 9 further for measuring a displacement of a pen-shaped pointing device's displacement normal to the writing surface and for using the measured normal displacement:
   to replace an activation button or to replace two activation buttons; or
   to interpret the normal displacement as a third dimension; or
   to use the normal displacement to correct horizontal measurements using height.

17. The graphic input device according to claim 16, further including means for changing characteristics of the transmitted US waves for affecting the received phase in such a way as to facilitate computing the displacement in fixed orthogonal (x-y) coordinates from the measured phase values.

18. The graphic input device according to claim 16, further including one or more zero force buttons installed on the pen-shaped device.

19. The graphic input device according to claim 16, wherein the writing surface is a planar, smooth surface.

20. The graphic input device according to claim 16, further including means for correcting for overflow at each 0-360 deg. Transition in the phase.

* * * * *